US008905832B2

(12) United States Patent
Miller

(10) Patent No.: US 8,905,832 B2
(45) Date of Patent: Dec. 9, 2014

(54) EVENT WAGERING WITH GROUP AND/OR IN RUN OPTIONS

(71) Applicant: CFPH, LLC, New York, NY (US)

(72) Inventor: Kenneth L. Miller, Las Vegas, NV (US)

(73) Assignee: CFPH, LLC, New York, NY (US)

( * ) Notice: Subject to any disclaimer, the term of this patent is extended or adjusted under 35 U.S.C. 154(b) by 0 days.

(21) Appl. No.: 13/754,522

(22) Filed: Jan. 30, 2013

(65) Prior Publication Data

US 2013/0196753 A1 Aug. 1, 2013

Related U.S. Application Data

(60) Provisional application No. 61/592,094, filed on Jan. 30, 2012, provisional application No. 61/708,185, filed on Oct. 1, 2012.

(51) Int. Cl.
*A63F 13/00* (2014.01)

(52) U.S. Cl.
USPC .............................................. 463/16; 463/20

(58) Field of Classification Search
CPC . G07F 17/3288; G07F 17/32; G07F 17/3217; G06Q 50/34
USPC ..................................................... 463/16–42
See application file for complete search history.

(56) References Cited

U.S. PATENT DOCUMENTS 5,741,181 A 4/1998 Nakagawa et al.
2002/0077712 A1 6/2002 Safaei et al.
2004/0192437 A1 * 9/2004 Amaitis et al. .................. 463/26
2004/0229671 A1 * 11/2004 Stronach et al. .................. 463/6
2005/0107151 A1 * 5/2005 Amaitis et al. .................. 463/16
2005/0116410 A1 * 6/2005 Vlazny et al. ................. 273/139
2005/0227757 A1 10/2005 Simon
2006/0135252 A1 6/2006 Amaitis et al.
2008/0113816 A1 5/2008 Mahaffey et al.
2008/0248850 A1 10/2008 Schugar
2009/0088232 A1 * 4/2009 Amaitis et al. .................... 463/6
2010/0331066 A1 * 12/2010 Jung et al. .......................... 463/6
2012/0034961 A1 * 2/2012 Berman et al. .................... 463/6

OTHER PUBLICATIONS

Notification of Transmittal of the International Search Report and the Written Opinion of the International Searching Authority for International Application No. PCT/US2013/023880 mailed Jun. 17, 2013 (15 pages).

* cited by examiner

*Primary Examiner* — Masud Ahmed
(74) *Attorney, Agent, or Firm* — Mark Miller

(57) ABSTRACT

Some embodiments include assigning each participant of a race to one of three groups, wherein based on odds one participant is deemed a favorite, one participant is deemed a long shot, and the remaining participants are deemed middle of the pack, wherein the favorite is assigned to a first one of the three groups, the long shot is assigned to a second one of the three groups, and the middle of pack are assigned to a third one of the three groups; receiving a wager on one of the three groups; receiving another wager on another of the three groups; determining which of the one or more groups is a winning group based on finishing positions of the participants at the designated point in the race; and facilitating a payment for the wagers made on the group determined to be the winning group.

19 Claims, 15 Drawing Sheets

200

162

| SELECTED HORSES | INTERMEDIATE POINT/FINISH LINE | | | | | | | |
|---|---|---|---|---|---|---|---|---|
| | 104a | 104b | 104c | 104d | 104e | 104f | 104g | 108 |
| HORSE # 1 | 2 | 2 | 4 | 3 | 4 | 3 | 3 | 1 |
| HORSE # 4 | 7 | 6 | 9 | 10 | 7 | 5 | 4 | 5 |
| HORSE # 6 | 12 | 10 | 7 | 8 | 8 | 7 | 9 | 11 |
| | 1 | 2 | 3 | 4 | 5 | 6 | 7 | 8 |

202

202

FIGURE 5

| SELECT FIVE BET AND RESULT DATA | | | | | |
|---|---|---|---|---|---|
| RACE | BETTOR 1 | BETTOR 2 | BETTOR 3 | BETTOR 4 | RACE WINNERS |
| 1 | | HORSE #3 | HORSE #4 | | HORSE #4 |
| 2 | HORSE #2 | HORSE #2 | | | HORSE #2 |
| 3 | | HORSE #8 | HORSE #8 | | HORSE #8 |
| 4 | | HORSE #5 | HORSE #5 | HORSE #5 | HORSE #5 |
| 5 | HORSE #6 | HORSE #6 | HORSE #6 | HORSE #8 | HORSE #6 |
| 6 | | | | HORSE #7 | HORSE #6 |
| 7 | HORSE #1 | | HORSE #1 | HORSE #7 | HORSE #1 |
| 8 | HORSE #2 | | | | HORSE #2 |
| 9 | | | | | HORSE #4 |
| 10 | HORSE #3 | | | HORSE #6 | HORSE #3 |
| SELECT FIVE WINNER? | YES | NO | YES | NO | |

FIGURE 12

20100 ~ DAY'S SELECT FIVE POOL = DAY'S SELECT FIVE BETS RECEIVED

20102 ~ DAY'S SELECT FIVE TAKE-OUT = COMMISSION RATE * DAY'S SELECT FIVE POOL

20104 ~ SELECT FIVE PAYOUT = DAY'S SELECT FIVE POOL-DAY'S SELECT FIVE TAKE-OUT + SELECT FIVE CARRYOVER

FIGURE 13

EVENT WAGERING WITH GROUP AND/OR IN RUN OPTIONS

CROSS REFERENCE TO RELATED APPLICATIONS

This application claims the benefit of U.S. provisional application 61/592,094 filed Jan. 30, 2012 to Kenneth Miller and U.S. provisional application 61/708,185 filed Oct. 1, 2012 to Kenneth Miller, both of which are hereby incorporated herein by reference.

FIELD

Some embodiments may relate to wagering.

BACKGROUND

Some players may desire to place wagers related to one or more events. For example, some players may desire to place a wager on the outcome of one or more sporting events (e.g., races).

SUMMARY

The following should be interpreted as example embodiments and not as claims.

A. A method comprising: assigning each participant of a race to one of a plurality groups, wherein each participant is assigned one of a consecutive sequence of number in the race event, the numbers beginning with one, and wherein the participants numbered 1 and 2 are assigned to a first of the plurality of groups, the participants numbered 3 and 4 are assigned to a second of the plurality of groups, and the participants numbered 5 and 6 are assigned to a third of the plurality of groups; receiving, by a computing device, a wager on one of the plurality of groups that at least one respective participant of that group will reach a designated point in the race first; receiving, by the computing device, another wager on another of the plurality of groups that at least one respective participant of the another group will reach the designated point in the race first; determining which of the one or more groups is a winning group based on finishing positions of the participants at the designated point in the race; and facilitating, by the computing device, a payment for the wagers made on the group determined to be the winning group.

A.1. The method of claim A, further comprising allocating the wager on the one group and the wager on the another group to the same pari-mutual pool. A.2. The method of claim A, wherein the designated point in the race is the finish line. A.3. The method of claim A, wherein the designated point in the race is an intermediate point in the race. A.4. The method of claim A, wherein the one wager and the another wager are received during a wagering window. A.4.1. The method of claim A.4, wherein the wagering window opens and closes before the start of the race. A.4.2. The method of claim A.4, wherein the wagering window closes at some time during the race. A.4.2.1. The method of claim A.4.2, wherein the wagering window opens at some time during the race. A.4.2.2. The method of claim A.4.2, wherein the wagering window opens before the start of the race. A.5. The method of claim A, comprising: determining that the wager on the one group should be allocated to a first pool based on receiving the wager on the one group before a start of the race and determining the wager on the other group should be allocated to second pool based on receiving the wager on the other group after the start of the race.

B. A method comprising: assigning each participant of a race to one of three groups, wherein each participant has respective odds associated therewith of winning the race, wherein based on the odds one participant is deemed a favorite, one participant is deemed a long shot, and the remaining participants are deemed middle of the pack, and wherein the favorite is assigned to a first one of the three groups, the long shot is assigned to a second one of the three groups, and the middle of pack are assigned to a third one of the three groups; receiving, by a computing device, a wager on one of the three groups that at least one respective participant of that group will reach a designated point in the race first; receiving, by the computing device, another wager on another of the three groups that at least one respective participant of the another group will reach the designated point in the race first; determining which of the one or more groups is a winning group based on finishing positions of the participants at the designated point in the race; and facilitating, by the computing device, a payment for the wagers made on the group determined to be the winning group.

B.1. The method of claim B, further comprising allocating the wager on the one group and the wager on the another group to the same pari-mutual pool. B.2. The method of claim B, wherein the first group is assigned a first color, the second group is assigned a second color, and the third group is assigned a third color. B.2.1. The method of claim B.2, wherein players wager on the groups by selecting one of the colors. B.2.2. The method of claim B.2, wherein the first color is red, the second color is green, and the third color is black. B.2.3. The method of claim B.2, wherein a sequence of the first, second, and third colors can be determined based on each respective participant's assigned group color and the finishing positions of the participants at the designated point in the race, and wherein a wager is offered to players based at least in part on the sequence of colors.

B.3. The method of claim B, further comprising: assigning each participant of the race to one of a plurality groups separate from the three groups, wherein each participant is assigned one of a consecutive sequence of number in the race event, the numbers beginning with one, and wherein the participants numbered 1 and 2 are assigned to a first of the plurality of groups, the participants numbered 3 and 4 are assigned to a second of the plurality of groups, and the participants numbered 5 and 6 are assigned to a third of the plurality of groups; receiving, by a computing device, a wager on one of the plurality of groups that at least one respective participant of that group will reach a designated point in the race first; receiving, by the computing device, another wager on another of the plurality of groups that at least one respective participant of the another group will reach the designated point in the race first. B.3.1. The method of claim B.3, further comprising: allocating the wager on the one of the three groups and the wager on the another of the three groups to a same first pari-mutual pool; and allocating the wager on the one of the plurality of groups and the wager on the another of the plurality of groups to a same second pari-mutual pool. B.4. The method of claim B, comprising: determining that the wager on the one group should be allocated to a first pool based on receiving the wager on the one group before a start of the race and determining the wager on the other group should be allocated to second pool based on receiving the wager on the other group after the start of the race.

C. A method comprising: opening, by a computing device, for a race a wagering window wherein the wagering window closes at some time during the race; assigning each participant of a race to one of two or more groups; receiving, by the computing device, after a start of the race at least one wager on one of the two or more groups that at least one respective participant of that group will reach a designated point in the race first; receiving, by the computing device, after a start of the race at least one wager on another of the two or more groups that at least one respective participant of that group will reach the designated point in the race first; determining which of the one or more groups is a winning group based on finishing positions of the participants at the designated point in the race; and facilitating, by the computing device, a payment for the wagers made on the group determined be the winning group.

C.1. The method of claim C, further comprising allocating the wager on the one group and the wager on the another group to the same pari-mutual pool. C.2. The method of claim C, wherein at least one of the wager on the one group and the wager on the another group are each a fixed odds wager. C.2.1. The method of claim C.2, wherein the fixed odds on a respective group may change during the wagering window. C.3. The method of claim C, comprising receiving a selection of the race and at least one additional wager as part of at least one of a daily double wager and a select n wager. C.4. The method of claim C, comprising: determining that the wager on the one group should be allocated to a first pool based on receiving the wager on the one group before a start of the race and determining the wager on the other group should be allocated to second pool based on receiving the wager on the other group after the start of the race.

C.5. The method of claim C, wherein each participant is assigned one of a consecutive sequence of number in the race event, the numbers beginning with one, and wherein the participants numbered 1 and 2 are assigned to a first of the plurality of groups, the participants numbered 3 and 4 are assigned to a second of the plurality of groups, and the participants numbered 5 and 6 are assigned to a third of the plurality of groups. C.6. The method of claim C, wherein each participant has respective odds associated therewith of winning the race, wherein based on the odds one participant is deemed a favorite, one participant is deemed a long shot, and the remaining participants are deemed middle of the pack, and wherein the favorite is assigned to a first one of the three groups, the long shot is assigned to a second one of the three groups, and the middle of pack are assigned to a third one of the three groups; C.6.1. The method of claim C.6, wherein the first group is assigned a first color, the second group is assigned a second color, and the third group is assigned a third color.

D. A method comprising: opening, by a computing device, a pre-race wagering window for daily double wagers that involve race one and race two for a day; receiving, by the computing device, a first daily double wager on race one and race two at a first time after the pre-race wagering window is open and before race one begins; based on the first time being before race one begins, allocating, by the computing device, the first daily double wager to a first pari-mutuel pool; opening, by the computing device, an in-race wagering window for daily double wagers that involve race one and race two for the day; receiving, by the computing device, a second daily double wager on race one and race two at a second time after race one begins; based on the second time being after the second race begins, allocating, by the computing device, the second wager to a second pari-mutuel pool; determining, by the computing device, that the first wager and the second wager are wining wagers based on outcomes of the first race and the second race; and facilitating, by the computing device, a first payment for the first wager from the first pari-mutuel pool and a second payment for the second wager from a second pari-mutuel pool.

D.1. The method of claim D comprising: closing the in-race wagering window based on a participant of race one reaching a designated intermediate point of race one. D.2. The method of claim D, wherein the first daily double wager and the second daily double wager are each select a respective group of participants to win race one. D.2.1. The method of claim D.2, comprising: assigning each participant of race one to one of a plurality of groups. D.2.1.1. The method of claim D.2.1, wherein each participant is assigned one of a consecutive sequence of number in the race event, the numbers beginning with one, and wherein the participants numbered 1 and 2 are assigned to a first of the plurality of groups, the participants numbered 3 and 4 are assigned to a second of the plurality of groups, and the participants numbered 5 and 6 are assigned to a third of the plurality of groups. D.2.1.2. The method of claim D.2.1, wherein each participant has respective odds associated therewith of winning the race, wherein based on the odds one participant is deemed a favorite, one participant is deemed a long shot, and the remaining participants are deemed middle of the pack, and wherein the favorite is assigned to a first one of the three groups, the long shot is assigned to a second one of the three groups, and the middle of pack are assigned to a third one of the three groups. D.3. The method of claim D, comprising receiving a selection of race one and race two from among a plurality of available races for inclusion in the daily double wager from both a submitter of the first daily double wager and submitter of the second daily double wager and in which both the first pari-mutuel pool and the second-pari-mutuel include wages based on other races.

FIGURES

FIG. 5 illustrates an example three-dimensional bet matrix that at least partially defines one or more bet components of an interval bet in accordance with an embodiment;

FIG. 12 illustrates example Select Five bet and result data which may be determined by a betting system platform and communicated to bettors, in accordance with an embodiment of the present invention;

FIG. 13 illustrates various equations for calculating potential Select Five bet payouts, in accordance with an embodiment of the present invention;

DETAILED DESCRIPTION

Figure 1:
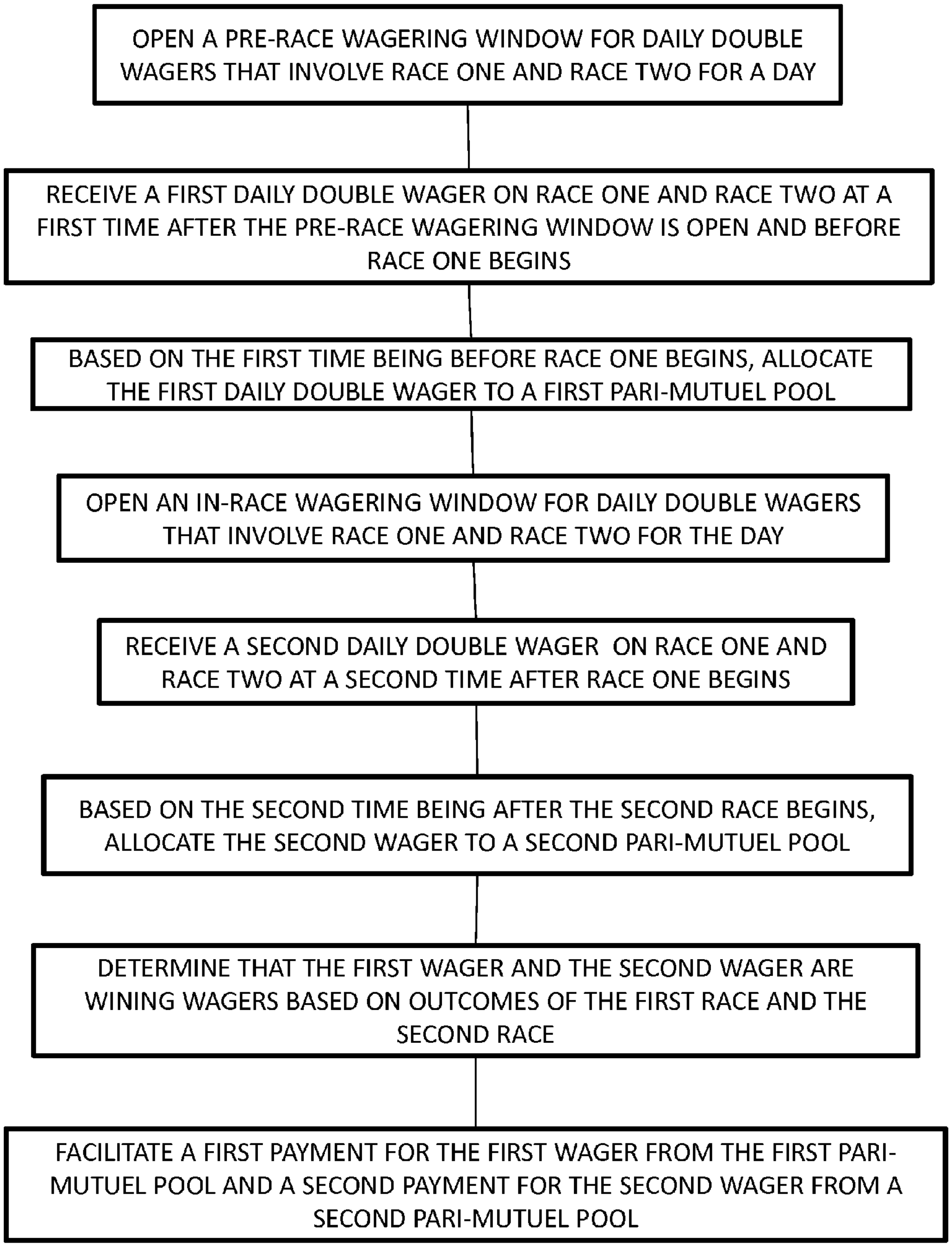
FIG. 1 illustrates an example method that may be used in some embodiments.

U.S. patent application Ser. No. 10/771,221 to Miller filed on Feb. 3, 2004; U.S. patent application Ser. No. 10/879,972 to Amaitis filed on Jun. 28, 2004; U.S. patent application Ser. No. 10/784,353 to Miller filed on Feb. 23, 2004; U.S. patent application Ser. No. 10/453,769 to Amaitis et al. filed on Jun. 3, 2003; U.S. patent application Ser. No. 11/022,394 to Amaitis et al. filed on Dec. 22, 2004; U.S. patent application Ser. No. 11/076,561 to Amaitis et al. filed on Mar. 9, 2005; U.S. patent application Ser. No. 11/021,848 to Amaitis et al. filed on Dec. 22, 2004; U.S. patent application Ser. No. 11/201,830 to Amaitis et al. filed on Aug. 10, 2005 are all hereby incorporated herein by reference.

Some embodiments may include offering a player an ability to place a wager that is based on the outcome of one or more events. Such events may include sporting events such as races (e.g., horse or dog races). Offering an ability may include presenting odds, determining odds, allowing a player to make a wager, allowing a player to choose events to include in a wager, accepting money from a player, forming a wager, publishing information about an offered wager, presenting a user interface through which a user may enter information identifying one or more characteristics of a wager, and so on.

In some embodiments, a wager may include a multi-part wager. For example, such a wager may include a daily double, a pick N, a select N, a group bet, and so on style of wager. A player for example may select a winner for one or multiple events occurring in a day (e.g., through a user interface). As an example, the player may select the winning horse in a set of five horse races throughout a particular day. A user may be able to select which races are included in the set and/or which horses are included in the wager for each race. In some embodiments, a number of races may be available to choose from and a horse may be assigned to each race automatically (e.g., a long shot, a favorite, randomly, etc.). A player may select the races (e.g., 5 races) to be included in the wager in such an example and the horse bet upon may be assigned automatically. In some embodiments, a player may select the horse and the race may be assigned automatically based on the horse being a participant in that race. In some embodiments, a player may select both races and horses within the races. In some embodiments, the races may be set rather than and/or in addition to the horses (e.g., the player may be required to wager on a specific set of races). The player may choose the horses and/or the horses may be set in some or all of the races. It should be recognized that any combination choosing and/or allowing choice of events and/or winners may be used in various embodiments. It should also be recognized that winners and races are given as non-limiting examples only and that other embodiments may include wagering on losers, wagering on groups of participants, and/or wagering on other events or games over any amount of time.

Some embodiments may include receiving information related to a wager. For example an amount of a wager, an identity of a person making a wager, one or more components of the wager (e.g., winners, races), and so on may be received (e.g., from a player entering such information through a user interface).

Some wagers may include in running wagers. An in running wager may include, for example, a wager placed on an event during the event and/or a wager placed on a subset of an event. For example, an in running wager may include a wager on a race that is placed before a participant reaches an intermediate point of the race but after the race starts. Such a wager may be on an outcome of the overall race and/or a portion of a race. As another example, an in running wager may include a wager placed before or during an event that is based on a sub part of the event, such as a position of one or more participants of a race at an intermediate point of the race. Various examples of wagers based on intermediate points and descriptions of example intermediate points are given herein and may be used in various combinations with some embodiments.

Some embodiments may include forming a wager in response to receiving information related to the wager. For example, a wager may be formed between a player and a house or other wagering venue. In some embodiments, a formed wager may include a pari-mutuel wager. Some examples of pooling wagers into pari-mutuel pools are described herein. In some embodiments, a formed wager may include a fixed odds wager. In some embodiments, a formed wager may include a wager with a spread, a variable component, and so on. It should be recognized that various embodiments may include any desired type of wager.

Some example wagers may include: a) a daily double wager placed after race one has started on horse two winning in race one and horse four winning in race two b) a wager that horse one will finish a first eighth of race one second and horse three will finish race three first c) a two part wager that is placed in separate parts with the first part placed after race one starts that horse four will finish the second eighth of race one the fastest and the second part placed after race two starts that horse five will finish a third eighth of race two the slowest d) a pick or select 3 bet where a first part is selected during race one to include a wager that horse one will win race one, a second part that is selected during race four that horse six will finish a fourth eighth of race four first and a third part that is selected before race five that horse ten will win race five e) a two part parlay wager placed during a first sports game that a first team will the first game and that a second team will score more points in a second half of a second sports game than another team f) a bet that horse one will win race one placed after race one has begun and that a horse in group "red" will win in race two g) a bet that more horses in the "red" groups of a set of races will in that set of races than horses in other groups or a specific other group (e.g., the "black" group) placed before or after a race of the set of races starts in which the races are picked by the player or set automatically. It should be recognized that various embodiments may include various types of wagers with desired characteristics and that the above examples are given as non-limiting examples to illustrate some possible combinations. Various embodiments may be combined in any manner to create any desired wagering options.

Some embodiments may include determining a pari-mutuel pool for a received wager. Some embodiments may include determining a pool based on a characteristic of a wager. For example, such a characteristic may include a type of wager, a number of components of a wager, a time of a wager, and so on. For example, pick and/or select n wagers may be placed in a separate pool from single race wagers. For example, in some embodiments, all pick n wagers may be placed in a same pool, so based on a wager being a pick n wager, it may be placed in the pick n pool. In some embodiments, for each time period (e.g., day, week, month) and each n, a separate pool may be formed. In some embodiments, wagers placed during an event may be placed into a separate pool from wagers placed before an event. Accordingly, some embodiments may determine a pool based on whether a wager is placed before or after a start of an event. For example, daily double wagers placed before a race starts may be placed in one pool but daily double wagers that are placed during a race may be placed in another pool.

In some embodiments, an interface for placing a wager may be presented and/or changed based on which pool such wager will be placed in. For example, in some embodiments, if a user accesses a betting interface before a race, such a betting interface may identify that a wager placed will be placed in a pre game pool. In some embodiments, when a pre game pool closes, such an interface may identify that a wager placed may be put into an in game pool rather than the pre game pool. Some embodiments may not include such identification, but rather may receive a wager through a betting interface and automatically route it to a pool (e.g., a pregame pool if the wager is place pre game or a in game pool if the wager is placed in game).

In some embodiments, a pool may be selected based on a user selection rather than and/or in addition to a timing. For example, in some embodiments, placement of a pre game wager may include selection of some control (e.g., button) through the interface that identifies the wager as a pre game wager and therefore the pool as a pre game pool. If such a wager is attempted after a game starts, the placement may be prevented. In some embodiments, placement of a wager in a in game pool may be made through an in game wager control (e.g., a button). Such selection may be made in game and/or pre game if desired in some implementations. If such a wager is attempted after an end of an in game wagering window, such wager may be prevented. Accordingly, some embodiments may allow a user to select which pool or type of wager is being made (e.g., pre game vs in game) based on interface input.

Some embodiments may include determining an opening and/or ending of a betting window. For example, pre game wagers for races may start being accepted at some desired time (e.g., 1 day before, 1 week before, 1 month before, 5 minutes before, and so on). Such wagers may end being accepted at some time (e.g., at a start of a race, 5 minutes before a start of a race, 1 hour before a start of a race, 10 seconds before a start of a race, and so on). As another example, some embodiments may include determining to begin accepting in game wagers at some desired time (e.g., after a start of a race, when/in response to pre-game wagers not being accepted, 5 seconds before a start of a race, 5 seconds after a start of a race, ⅛ of a length into a race, and so on). As yet another example, some embodiments may include determining that a in game wagering window should close (e.g., in response to determining a time period has passed since a start of a race, based on participants reaching some point in a race, and so on).

Some embodiments may include automatic and/or manual triggers for opening and/or closing windows. For example, camera information from intermediate points (e.g., indicating a horse has reached that point) may trigger a closing of an in game wagering window (e.g., at a final stretch, at a half way point, at a first eighth, etc.). As another example, an electronic signal from a gate opening mechanism may trigger an end of a pre game window and a start of an in game window. In some embodiments, an attendant may enter information about a start or ending trigger into a computer system (e.g., based on seeing a race start or seeing a participant reach a point in the race).

Some embodiments may include presenting information to one or more users regarding possible wagering. Such information may be presented through an interface (e.g., of a mobile device) that may be used for placing a wager. Such information may aid in wagering and/or entice wagering by a user. For example, in some embodiments, an interface may be controlled to show a time left in or before a betting window (e.g., estimated based on speed of racers and distance to trigger, actual), a distance before a trigger, odds for a wager, an amount of money in a pool, group designations, and so on. In some embodiments, an interface may show a number of people that are using similar interfaces to view wagering information about a race. Such information may entice a person to wager if the number is large because a possible pool may then become large as well if those people enter wagers.

Some embodiments may present an amount of money in such other users accounts (e.g., as a sum) to show that a large amount of money may be wagered in a particular race. Some embodiments may include determining whether one or more wagers are winning or losing wagers. In response to determining winning wagers, a payment may be facilitated to players associated with such winning wagers (e.g., in cash, to a wagering account, etc.). A winning wager may include a wager in which all and/or some portion (e.g., most, more than others, majority, all but one, predetermined amount) of components are winning components. A payment may include a portion of a pari-mutuel pool based on a number of other winners.

Some embodiments may include one or more computer and/or electronic components that may communicate with one another to facilitate wagering according to one or more methods described. For example, a server may receive wagers, determine pools, manage accounts, determine outcomes, facilitate payments, and/or perform other functions. One or more mobile devices and/or other computing devices may accept wagers, accept input present information to users, and so on. Some embodiments may include attendant terminals and/or ticket machines that may print wager tickets, accept money, pay money, and/or enter information related to wagers and/or events (e.g., trigger windows, enter points, winner orders, and so on). It should be recognized that any combination of computer systems and/or components may be used in various embodiments.

Daily Double Example

FIG. 1 illustrates one example of a method that may be performed in some embodiments. It should be recognized that this example method is given as a non-limiting example only and that other embodiments may include other events, other wagers, other components, other actions, other steps, and so on in any manner. One or more actions and/or methods may be performed in part by one or more computing devices.

As illustrated, some embodiments may include opening a pre-race wagering window for daily double wagers that involve race one and race two for a day. During such a window players may place multicomponent bets on a winner of race one and a winner of race two that win if the both winners are successfully selected. Such a window may stay open until some closing triggering event. It should be recognized that race one and race two may be designations given to any races over any period of time (e.g., race one may occur after race two, race one may be a fifth race of a day, etc.) and/or a first and second race of a day.

As illustrated, some embodiments may include receiving a first daily double wager on race one and race two at a first time after the pre-race wagering window is open and before race one begins. Such a wager may be received from one or more players through one or more wagering interfaces and may identify one or more participants to win each race and an amount of money wagered. In some embodiments, information identifying the wager may be received not at a single time but at multiple times as a use selects the components of the wager. Nonetheless, in some embodiments, a wager may still be considered to be received when all of the components that define the wager are received. In some embodiments, parts of the wager may be set at different times (e.g., the race one portion before race one and the race two portion after race one). In some embodiments, receipt of the first daily double wager may refer to received of a first part of that wager (e.g., a selection related to race one and the selection related to race two may be received at a later time).

As illustrated, some embodiments may include based on the first time being before race one begins, allocating the first daily double wager to a first pari-mutuel pool. In some embodiments, at least some portion of an amount wagered may be placed into a pari-mutuel pool. Such placement may be made because of a time when the wager is placed. It should be recognized that other embodiments may include some element of pool selection by a player as described herein.

As illustrated, some embodiments may include opening an in-race wagering window for daily double wagers that involve race one and race two for the day. Such a window may be opened when/based on a closing of a pre-race window. For example, such a window may be opened after a race starts and/or some time after a race starts. In some embodiments, a pre-race window may be closed when a race starts and/or some time before a race starts.

As illustrated, some embodiments may include receiving a second daily double wager on race one and race two at a second time after race one begins. Such a wager may be received from one or more players through one or more wagering interfaces and may identify one or more participants to win each race and an amount of money wagered. Such a wager may be received after the in-race wagering window has opened and/or after a pre-race wagering window has closed. Such a wager may include a wager on a same or different participants as the first wager. Such a wager may allow a player to place a wager after a start of a race to determine that some anomaly does not cause a problem with a participants starting performance (e.g., a jockey falling off a horse at a start of a race). In some embodiments, information identifying the wager may be received not at a single time but at multiple times as a use selects the components of the wager. Nonetheless, in some embodiments, a wager may still be considered to be received when all of the components that define the wager are received. In some embodiments, parts of the wager may be set at different times (e.g., the race one portion during race one and the race two portion after race one). In some embodiments, receipt of the second daily double wager may refer to received of a first part of that wager (e.g., a selection related to race one and the selection related to race two may be received at a later time).

As illustrated, some embodiments may include based on the second time being after the second race begins, allocating the second wager to a second pari-mutuel pool. In some embodiments any wagers received after a race begins and/or in-race wagering window is opened may be assigned to the second pari-mutuel pool rather than the first pari-mutuel pool. In some embodiments, at least some portion of an amount wagered may be placed into the pari-mutuel pool. Such placement may be made because of a time when the wager is placed. It should be recognized that other embodiments may include some element of pool selection by a player as described herein.

Some embodiments may include seeding one or more pari-mutuel pools. For example, a second pool may be seeded to provide an initial set of starting odds that mirrors or are otherwise based on odds at an end of a pre-race window for the first pool. In some embodiments, an amount of seeding of a second pool may be based on an amount tin a first pool. In some embodiments, a portion of a first pool may be allocated to seed a second pool. It should be recognized that even though examples of seeding a second pool are described either and/or both pools may be seeded as desired in any manner.

Some embodiments may include closing an in-race window. Such a window may be closed in response to some trigger (e.g., a time, a location of participants, and so on). Such a trigger may include an automatic detection of such an event occurring and/or an attendant entering such information into a system. Such a trigger may be based on an operator preference, laws regulating wagering, and so on.

As illustrated, some embodiments may include determining that the first wager and the second wager are winning wagers based on outcomes of the first race and the second race. Some embodiments may include determining that one or more wagers is a losing wager. Both wagers may be winning wagers, for example, if they are on the same participants.

As illustrated, some embodiments may include facilitating a first payment for the first wager from the first pari-mutuel pool and a second payment for the second wager from a second pari-mutuel pool. A payment may include a proportional share of a respective pari-mutuel pool based on an amount of money wagered on the winning participants in that pool. Accordingly, even though a first and second wager may be for a same amount and a same participants, they may result in different payments because they are paid based on different pools. Accordingly, published odds that may be presented and/or received odds may be different for each pool and wager.

Intermediate Points Examples

Some embodiments may include bets made when a participant of a race reaches at or before some intermediate point in a race and/or may be resolved when a participant reaches such an intermediate point in a race. For example, a daily double wager as discussed above may be based on an intermediate point rather than and/or in addition to an end of a race. It should be recognized that races and points in races are non-limiting examples only and that other embodiments may include any type of event (e.g., a sporting event such as football) and any type of time period or intermediates within such an event (e.g., before a first time). Various examples related to such intermediates are described herein as examples and may be used together with any embodiment in any combination. Components described in such embodiments may be used together in any combination.

Figure 2:
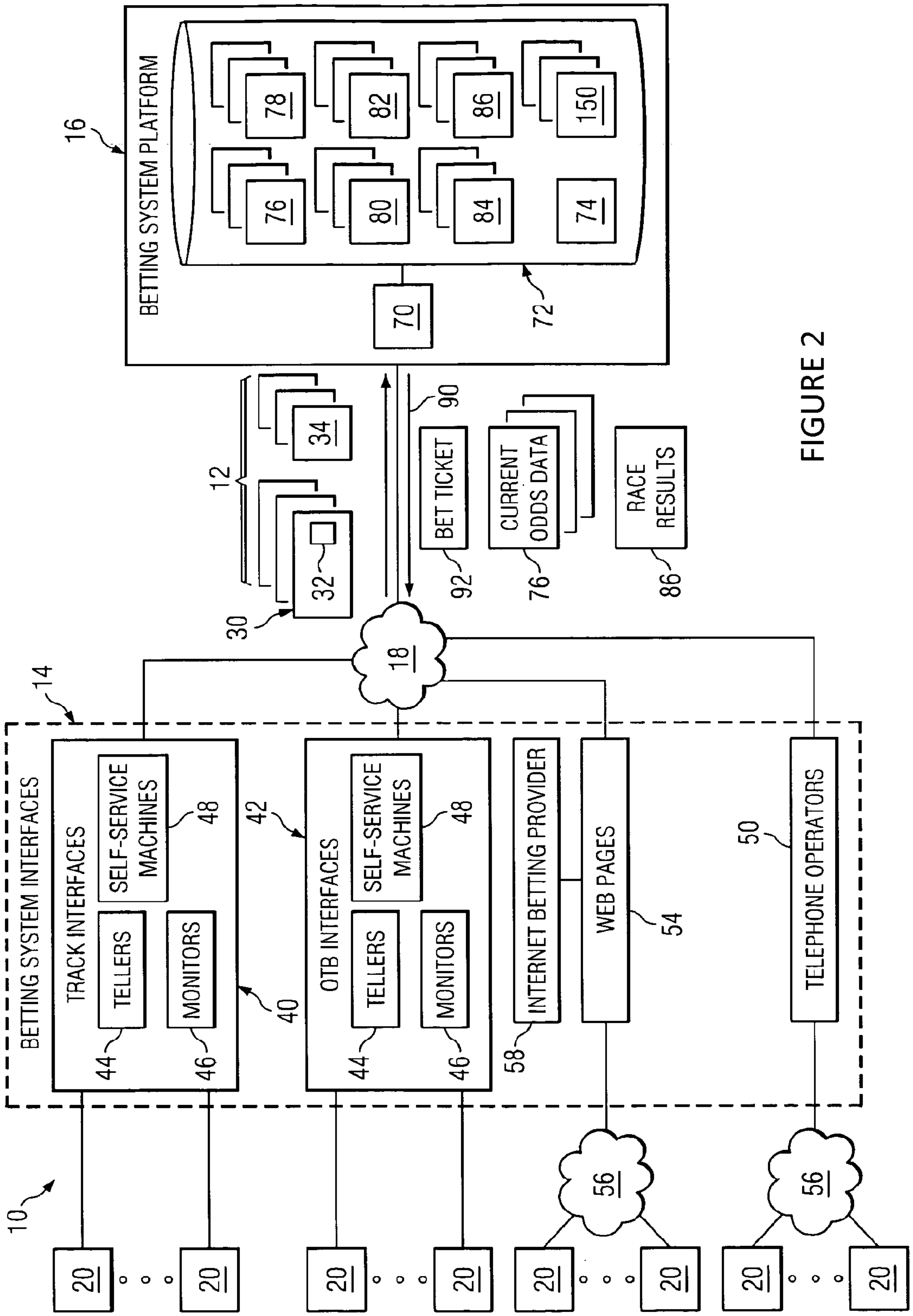
FIG. 2 illustrates an example system for providing and managing interval bets regarding intermediate points in a race event in accordance with an embodiment.

FIG. 2 illustrates an example system 10 for providing and managing interval bets regarding intermediate points in a race event in accordance with an embodiment. System 10 includes one or more betting system interfaces 14 and a betting system platform 16 coupled by one or more communications networks 18. In general, one or more customers 20 may receive betting information (such as event times, betting rules, betting options and odds, for example) and/or place bets 12 via betting system interfaces 14. In some embodiments, bets 12 are received by betting system interfaces 14 and communicated to betting system platform 16. Betting system platform 16 may then store the received bets 12, determine appropriate odds, bet results and payouts, and communicates such odds, bet results and payouts to one or more of the betting system interfaces 14.

System 10 permits customers 20 to place interval bets 30 on a race event having a group of race participants, such as a horse race, dog race, or auto race, for example. In some embodiments, each interval bet 30 may include one or more bet components 32, each comprising a bet regarding the positions of one or more particular race participants at one or more intermediate points in the race event and/or at the finish of the race event. Thus, a particular interval bet 30 may in fact comprise a number of different bets. For instance, in a one-mile horse race, an example interval bet 30 may include a first bet component 32*a* regarding whether Horse #3 will be in 5th place at the ¼ mile point of the race; a second bet component 32*b* regarding whether Horse #3 will be in 2nd place at the ½ mile point of the race; a third bet component 32*c* regarding whether Horse #3 will be in 7th place at the ¾ mile point of the race; and a fourth bet component 32*d* regarding whether Horse #3 will be in 1st place at the finish line (i.e., the 1 mile point) of the race. Interval bets 30 and bet components 32 of interval bets 30 are described below in greater detail.

In some embodiments, system 10 may also permit customers 20 to place traditional bets 34 in addition to interval bets 30. Traditional bets 34 may include bets such as win bets, place bets, show bets, exacta bets, trifecta bets, wheel bets, box bets, daily double bets, and pick-six bets, among others, for example. In some embodiments, a customer 20 may place one or more traditional bets 34 and one or more interval bets 30 on the same race event or group of race events.

Odds and/or payouts for bets 12 provided by system 10 (including interval bets 30 and/or traditional bets 34) may be determined in any suitable manner. For example, odds and/or payouts for some bets 12 provided by system 10 may be determined according to a pari-mutuel system in which the wager amounts for a group of bets 12 (such as a particular type of bet 12 or bets 12 regarding a particular race event, for example) are pooled, a commission (or "take-out") is taken by the track or other wagering provider, and the remainder is distributed among the winning bettors. Alternatively, odds and/or payouts for some bets 12 provided by system 10 may be determined according to some other system, such as a betting system in which customers 20 take positions against a bookmaker, for example. For some bets 12, predetermined or fixed odds may be determined and communicated to customers 20.

In particular, bet components 32 for interval bets 30 may be determined in a pari-mutuel manner, using predetermined or fixed odds, or in any other suitable manner. Certain interval bets 30 may include one or more pari-mutuel bet components 32 (bet components 32 whose odds and/or payouts are determined in a pari-mutuel manner) and one or more bet components 32 whose odds and/or payouts are otherwise determined (such as based on fixed odds). In some embodiments, a separate pari-mutuel pool is provided for each type of pari-mutuel bet component 32 included in an interval bet 30. The wager amounts for each type of pari-mutuel bet component 32 included in an interval bet 30 placed by one customer 20 may then be pooled with the wager amounts for the same type of bet component 32 of interval bets 30 placed by other customers 20. In addition, a different set of pari-mutuel pools may be provided for each race event. In some embodiments, when there are no winning bet components 32 in a particular pari-mutuel pool, the wager amounts in that pool may be returned to the customers 20, carried over to a new pari-mutuel pool for a subsequent race, or otherwise managed.

Betting system interfaces 14 may include any suitable interface between a customer 20 and betting system platform 16. For example, as shown in FIG. 2, betting system interfaces 14 may include physical interfaces, such as track interfaces 40 and/or off-track interfaces 42. Track interfaces 40 are generally located at a track, while off-track interfaces 42 are generally located at an off-track-betting (OTB) establishment, such as an OTB parlor. Track interfaces 40 and off-track interfaces 42 may include tellers 44, which may receive bets 12 from and distribute payouts to customers 20, and/or monitors 46, which may be viewed by customers 20 to monitor betting information such as the event time, the current odds, and the projected or actual payouts for various bets 12, for example. In some situations, such information may be updated substantially in real time or at preset intervals (such as every 30 seconds or after each intermediate point in the race event, for example) as new bets 12 are placed and/or as information regarding the event changes, for example. Monitors 46 may include, for example, tote-boards or closed-circuit televisions located at a track or OTB establishment.

Track interfaces 40 and/or off-track interfaces 42 may also include one or more self-service betting machines 48. In some embodiments, self-service betting machines 48 allow customers 20 to insert payment into the machine (such as cash or by using a voucher or a credit or debit card), place one or more interval bets 30 and/or traditional bets 34, and receive a printout (such as a ticket, for example) indicating the bet or bets placed. Printouts for winning bets may be inserted into the self-service betting machine, such as to receive a payment voucher (which may be used to receive a payout from a teller 44) or to place additional bets 12. In other embodiments, self-service betting machines 48 allow customers 20 to use a credit or debit card to place bets 12. The credit or debit card may have an associated account, which may be a betting account provided and/or managed by a betting account provider. In some embodiments, after the race event is completed, a customer 20 may insert or swipe his or her credit or debit card in the self-service betting machines 48 in order to update the balance on the card. Self-service betting machines 48 may also allow the customer 20 to print out payment vouchers which may be presented to a teller 44 in order to receive payments.

As shown in FIG. 2, betting system interfaces 14 may also include various non-physical interfaces, such as one or more telephone operators 50 and one or more web pages 54. Customers 20 may access or communicate with such non-physical interfaces via one or more communications networks 56. Communications networks 56 may include one or more servers, routers, switches, repeaters, backbones, links and/or any other appropriate type of communication devices coupled by links such as wire line, optical, wireless, or other appropriate links. In general, communication network 56 may include any interconnection found on any communication network, such as a telephone network, a local area network (LAN), metropolitan area network (MAN), wide area network (WAN), the Internet, portions of the Internet, or any other data exchange system. To access betting system interface 14 using communication networks 56, customers 20 may use a computer, a personal digital assistant (PDA), a cell-phone, a remote paging device, an electronic mail communication device, a handheld betting device, or any other suitable mobile device. In certain embodiments, customers 20 may receive any suitable information, such as betting information, from betting system platform 16 via mobile devices using, for example, communication networks 56 and betting system interfaces 14.

Telephone operators 50 may communicate betting information (such as event times, betting rules, betting options and odds, for example) to, and take bets 12 from, customers 20. Similarly, web pages 54 may communicate betting information to customers 20 and allow customers 20 to place bets 12. One or more of such web pages 54 may be hosted by one or more servers associated with system 10, which server or servers may also host betting system platform 16 in some embodiments. In some embodiments, betting information available to customers 20 via web pages 54 may be updated substantially in real time or at preset intervals (such as every 30 seconds, for example) as new bets 12 are placed and/or as information regarding the event changes, for example.

In some embodiments, one or more web pages 54 may be provided by, or associated with, an Internet betting provider 58, for example. Internet betting provider 58 may provide Internet account wagering by providing online betting accounts to one or more customers 20. Using an online betting account, a customer 20 may interface with one or more web pages 54 associated with the Internet betting provider 58 in order to fund the account, view betting information regarding race events, and place bets 12 (such as interval bets 30 and/or traditional bets 34). Such online betting accounts may include one or more various types of accounts, such as deposit accounts, credit accounts, stop-loss accounts, and hybrid accounts, for example.

Some or all of the betting system interfaces 14 of system 10 may be operable to offer or receive both interval bets 30 and traditional bets 34. However, in some embodiments, one or more betting system interfaces 14 may only offer or receive either interval bets 30 or traditional bets 34. For example, in a particular embodiment, a set of web pages associated with betting system platform 16 may allow customers 20 to place both interval bets 30 and traditional bets 34, while a particular self-service betting machine 48 may only allow customers 20 to place interval bets 30, or vice versa.

As discussed above, betting system platform 16 is operable to receive bets 12 (including both interval bets 30 and traditional bets 34) from betting system interfaces 14, store the received bets 12, determine appropriate odds, bet results and payouts, and communicate such odds, bet results and/or payouts to one or more of the betting system interfaces 14, which may then display such odds, bet results and/or payouts to customers 20. As shown in FIG. 2, betting system platform 16 includes a processor 70 coupled to a memory 72. Processor 70 is generally operable to execute a betting system software application 74 or other computer instructions to determine current odds data 76, bet results 78, and payouts 80, which are discussed below in greater detail.

As discussed above, betting system platform 16 may include processor 70 and memory 72. Processor 70 may comprise any suitable processor that executes betting system software application 74 or other computer instructions, such as a central processing unit (CPU) or other microprocessor, and may include any suitable number of processors working together. Memory 72 may comprise one or more memory devices suitable to facilitate execution of the computer instructions, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), or any other suitable volatile or non-volatile memory devices.

Memory 72 is generally operable to store various information that may be used by processor 70 in determining odds, bet results and/or payouts. For example, memory 72 may comprise any suitable number of databases, which may be co-located or physically and/or geographically distributed. In the example shown in FIG. 2, memory 72 may store any or all of the following: betting system software application 74, current odds data 76, bet results 78, payouts 80, race event parameters 82, bet parameters 84, race results 86, and bet matrices 150.

Current odds data 76 may include current or near-current data regarding, for example, (a) the wager amounts stored in pari-mutuel pools for various bets 12 (including interval bets 30, bet components 32 and/or traditional bets 34), (b) current odds data for various bets 12 (whether such bets 12 are pari-mutuel or fixed odds bets), and/or (c) potential payout data for various bets 12, such that customers 20 may determine the potential payouts for bets 12 based on the wager amounts of such bets 12. As discussed above, processor 70 is operable to execute betting system software application 74 to determine such current odds data 76. Processor 70 may determine such current odds data 76 based at least on data received from memory 72 and/or one or more betting system interfaces 14. In addition, processor 70 may update such current odds data 76 based on new information being received by betting system platform 16. In some embodiments, processor 70 may update current odds data 76 in real time, substantially in real time, or at preset intervals (such as every 30 seconds, for example).

As shown in FIG. 2, current odds data 76 may be communicated to one or more betting system interfaces 14 via communications network 18, as indicated by arrow 90. Current odds data 76 may then be made available to customers 20, such as via tote boards or monitors 46 located at a track or OTB establishment, for example, or in appropriate web page(s) 54 that may be accessed by customers 20, for example. In this manner, customers 20 may have access to real-time or substantially real-time current odds data 76 regarding various bets 12 or race events.

Bet results 78 may comprise various data regarding the results of various bets 12 (including interval bets 30, bet components 32 and/or traditional bets 34), such as the identity of the customer 20 who placed the bet 12, the result of the bet, the determined payout 80 for the bet 12 and/or whether the payout 80 was distributed to the customer 20, for example. Possible results for a bet 12 may include, for example, "win," "lose," "push," or "no action." Processor 70 may determine such results for a bet 12 based on race event parameters 82 regarding one or more relevant race events, bet parameters 84 regarding the bet 12, race results 86 regarding one or more relevant race events (which may include the positions of various race participants at each intermediate point 104 and at the finish line 108 of the race as illustrated, for example, in FIG. 3), and bet matrices 150 generated by betting system platform 16.

Processor 70 may determine payouts 80 for each winning bets 12 based on various data depending on whether the bet 12 is a pari-mutuel, fixed-odds, or other type of bet. Processor 70 may determine payouts 80 for winning pari-mutuel and fixed-odds bets 12 according to known methods for determining payouts for such types of bets. It should be understood that the payouts 80 determined by betting system platform 16 may comprises potential payouts and profits, which may be calculated and/or updated dynamically prior to the race, or actual payouts and profits, which may be calculated after betting on the race has been closed, or after the race has been run and/or declared "official."

Race event parameters 82 may comprise various parameters of one or more race events, such as, for example, the type of race event, the time, date and location of the race event and/or the number (or in some cases, the name) of each of the participants in the race event.

Bet parameters 84 may comprise various parameters of one or more received bets 12 (including interval bets 30, bet components 32 and/or traditional bets 34), such as the identity of the customer 20 who placed the bet 12, the manner in which the bet 12 was placed (such as via telephone, the Internet, or in person at a track or OTB establishment, for example), the type of bet 12 (such as whether the bet 12 is an interval bet 30 or a traditional bet 34, for example), the commission rate on the bet 12, the particular participants determined (for example, selected by the customer 20 or determined by betting system platform 16 randomly, based on previous race results, or based on the participants determined for other customer's bets 12 and/or the wager amounts of such other bets, or otherwise determined) for an interval bet 30, and/or the wager amount of the bet 12.

Race results 86 may comprise various data regarding the results of one or more race events, such as the position of each participant at various intermediate points and at the finish line of a race, whether there was a tie for any position and/or whether any participants did not finish the event, for example. Race results 86 may be received from various intermediate point recording devices and finish line recording devices located around a racetrack, as discussed in greater detail below with reference to FIG. 3.

Bet matrices 150 may define various bet components 32 of an interval bet 30. Bet matrices 150 may by generated by betting system platform 16 based on various inputs, such as race event parameters 82 regarding one or more race events and particular bet parameters 84 (which may be selected by a customer 20 or determined by betting system platform 16), for example. In some embodiments, betting system platform 16 may populate (or fill in) at least a portion of a bet matrix 150 with randomly determined numbers representing possible positions of race participants at various intermediate points and/or at the finish line of a race event. In some embodiments, bet matrices 150 are physically printed on bet tickets 92 and given to customers 20 who place interval bets 30 such that a customer 20 may follow the progress of his interval bet 30 and determine the results of the bet components 32 of the interval bet 30. In other embodiments, bet matrices 150 are not physically printed on bet tickets 92. In either embodiment, bet matrices 150 are stored and utilized by betting system platform 16 to define and manage bet components 32. In some embodiments, by using a computerized betting system platform 16, bet matrices 150 may be generated and/or recorded nearly instantaneously, including populating at least a portion of such bet matrices 150 with randomly generated entries.

It should be understood that references herein to making "random" determinations (such as randomly determining numbers for a bet matrix, randomly determining possible positions of race participants, or randomly determining particular race participants for an interval bet 30, for example) includes using a computer (such as a computer associated with betting system platform 16, for instance) to determine "random" or "pseudo-random" numbers using any known or otherwise suitable algorithms or techniques.

As discussed above, one or more communications networks 18 couple and facilitate wireless or wireline communication between one or more betting system interfaces 14 and betting system platform 16. Each communication network 18 may include one or more servers, routers, switches, repeaters, backbones, links and/or any other appropriate type of communication devices coupled by links such as wire line, optical, wireless, or other appropriate links. In general, each communication network 18 may include any interconnection found on any communication network, such as a local area network (LAN), metropolitan area network (MAN), wide area network (WAN), the Internet, portions of the Internet, or any other data exchange system.

It should also be understood that one, some or all of the components of betting system platform 16 may be located together or may be physically or geographically distributed. In addition, one, some or all of the components of betting system platform 16, as well as any wager pools (such as pari-mutuel pools, for example) associated with interval bets 30, may be located at a track at which race events associated with such interval bets 30 are hosted or at any other suitable location, such as at another track or OTB entity, for example. In some embodiments, for example, pari-mutuel pools for particular interval bets 30 (or bet components 32) are hosted by the track at which the race events covered by such bets are occurring. In other embodiments, pari-mutuel pools for particular interval bets 30 (or bet components 32) are hosted by a track or OTB entity separate from the track at which the race events covered by such bets are occurring.

Example Track Configuration

Figure 3:
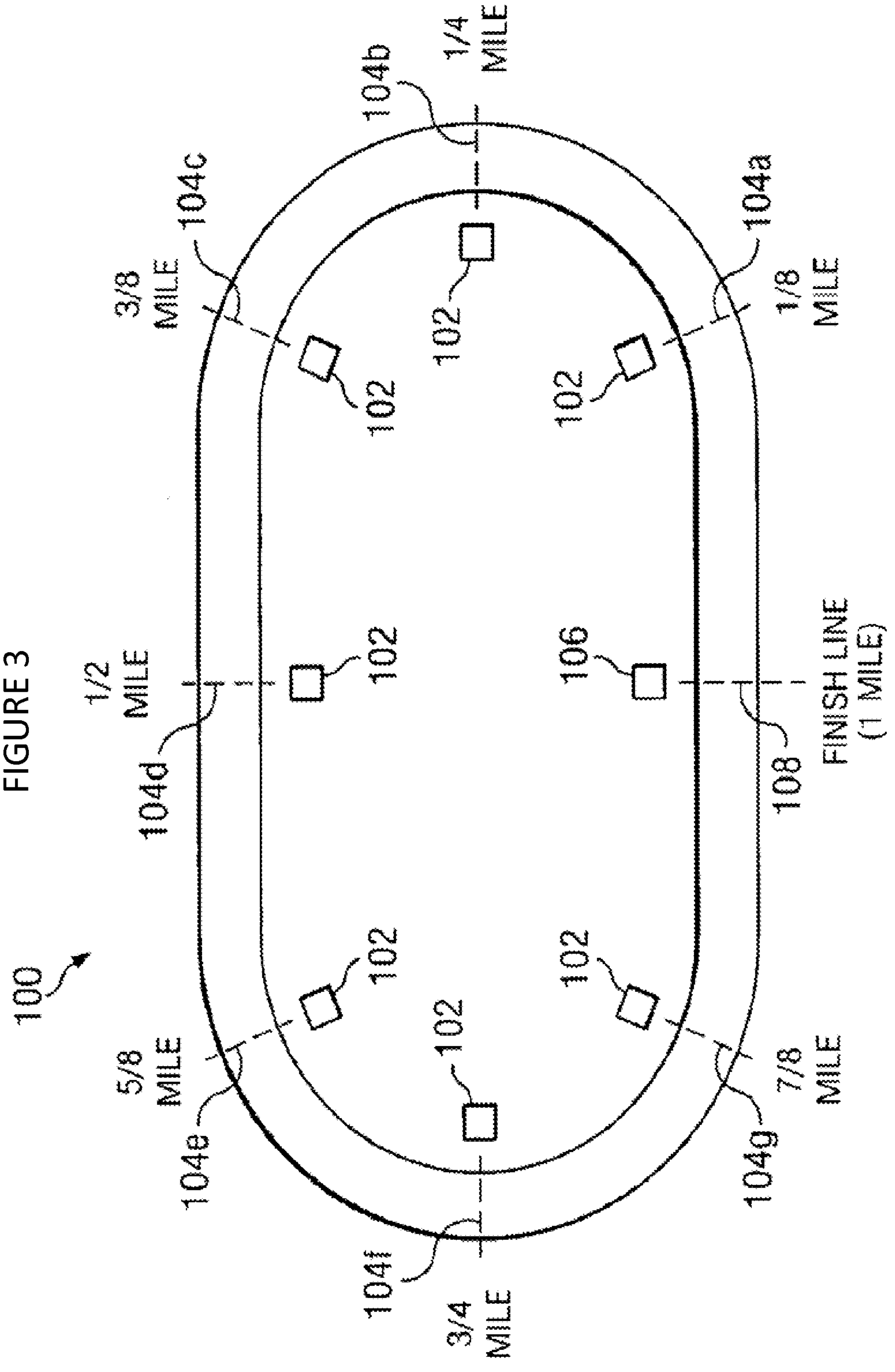
FIG. 3 illustrates an overview of an example race track used in the system of FIG. 2.

FIG. 3 illustrates an overview of a race track 100 for an example race event. Race track 100 may be any suitable length and shape, such as a one-mile oval track, for example. Intermediate point recording devices 102 may be located at each of one or more intermediate points 104 along race track 100, and finish line recording devices 106 may be located at the finish line 108 of race track 100. Intermediate point recording devices 102 and finish line recording devices 106 may comprise any devices suitable for recording the actual positions of race participants as such race participants cross intermediate points 104 and finish line 108. For example, intermediate point recording devices 102 and/or finish line recording devices 106 may include a teletimer, a camera and/or other suitable timing and recording devices. In some embodiments, intermediate point recording devices 102 include timing and recording devices similar to those commonly found at the finish line of race events.

In the example embodiment shown in FIG. 3, track 100 is a one-mile oval track having seven intermediate points **104*a*-104*g*, one at each ⅛ mile along track 100 (not counting the finish line 108). Intermediate point recording devices 102 are located at each intermediate point 104*a*-104*g* and finish line recording devices 106 are located at the finish line 108. Different numbers of intermediate points 104*a*-104*g* may be used for races of various lengths. For example, for a ¾ mile race that begins at intermediate point 104*b*, the race may include five intermediate points 104 (104*c*-104*g*) and the finish line 108. For a one-mile race, the race may include all seven intermediate points 104*a*-104*g* and the finish line 108. In races that are longer than one mile (i.e., one full lap around track 100), the finish line 108 may act as an intermediate point 104 as well as the finish line 108. For example, for a 1½ mile race that begins at intermediate point 104*d*, the race may include intermediate points 104*e*-104*g* and finish line 108 acting as an intermediate point 104, and then a full lap including intermediate points 104*a*-104*g* and the finish line 108 acting as the finish line of the race. Although particular shapes and lengths are used to provide details regarding an example track 100, it should be understood that in other embodiments, track 100 may have any shape and length, and may include any number of intermediate points 104** arranged in any configuration and at any distance from each other. In this regard, intermediate points may or may not be equidistant from each other.

Interval Bets

As discussed above, system 10 permits customers 20 to place interval bets 30 on race events having a plurality of race participants, such as horse races, dog races, or auto races, for example. Each interval bet 30 may include one or more bet components 32, each comprising a bet regarding the positions of one or more particular race participants at one or more intermediate points 104 and/or at the finish line 108 of the race event.

As discussed above, each bet component 32 of an interval bet 30 may be defined by one or more various bet parameters 84, such as one or more particular race participants, one or more particular intermediate points 104, and one or more possible positions of race participants at such intermediate points 104 and/or at the finish line 108, for example. Further, the result of each bet component 32 of an interval bet 30 may be determined based on whether one or more particular race participants determined for the interval bet 30 are positioned in one or more possible positions determined for one or more particular intermediate points 104. For some interval bets 30, each bet component 32 corresponds with one of the plurality of intermediate points 104, and the result of each bet component 32 is determined based on whether one or more particular race participants determined for the interval bet 30 are positioned in one or more possible positions determined for the intermediate points 104 corresponding to that bet component 32. For example, a first bet component 32 of an interval bet 30 may comprise a bet on whether three particular horses—Horses #2, #7 and #5—are positioned in order in three randomly-determined possible positions—Positions #3, #8 and #1 (i.e., 3rd place, 8th place, and 1st place)—at a first intermediate point 104*a* of a horse race. A second bet component 32 of the same interval bet 30 may comprise a bet on whether the same three particular horses—Horses #2, #7 and #5—are positioned in order in three other randomly-determined particular possible positions—Positions #4, #3 and #7 (i.e., 4th place, 3rd place, and 7th place)—at a second intermediate point 104*b* of the same horse race. Additional bet components 32 of the same interval bet 30 may be based on whether the same or different horses are positioned any suitable number and combination of other randomly-determined possible positions at other intermediate points 104 or the finish line 108 of the same race.

The particular race participants determined for an interval bet 30 may be determined in any suitable manner. For example, one or more of the particular race participants may be selected by the customer 20 placing the interval bet 30. As another example, one or more of the particular race participants may be randomly selected by betting system platform 16. As another example, one or more of the particular race participants may be selected by betting system platform 16 based on race results regarding one or more previous race events. For instance, betting system platform 16 may select the particular race participants for an interval bet 30 based on (1) the finishing positions (or positions at some intermediate point) of race participants in a particular previous race and the numbers worn by such race participants, (2) results from one or more previous races regarding particular jockeys riding in the current race event, or (3) the finish positions (or positions at some intermediate point) in one or more previous races of one or more of the race participants participating in the current race. In a particular embodiment, betting system platform 16 may select as the particular race participants for an interval bet 30 the participants wearing the numbers of the one or more top-finishing participants in a particular previous race.

As yet another example, in embodiments in which interval bets 30 (or particular bet components 32) are pari-mutuel bets, one or more of the particular race participants for an interval bet 30 may be selected by betting system platform 16 based on (a) the participants selected for other customer's interval bets 30 on the same race event and/or (b) the wager amounts of such other interval bets 30. In some embodiments, betting system platform 16 may select the particular race participants for an interval bet 30 based on one or both of such inputs in order to increase or maximize (at least at the time that the particular race participants are selected for the interval bet 30) the potential payout(s) 80 for the customer 20 placing the interval bet 30 if the interval bet 30 (or particular bet components 32 of the interval bet 30) are winning bets. For example, for a particular interval bet 30 being generated for a particular race event, betting system platform 16 may determine for each race participant in the particular race event, the total wager amount of all other interval bets 30 for which that race participant was selected. Betting system platform 16 may then select the one or more race participants having the least associated total wager amount as the particular race participants for the particular interval bet 30. Thus, the potential payout(s) for the particular interval bet 30 may be increased or maximized (at least at the time that the particular race participants are selected for the particular interval bet 30) for the customer 20 placing the particular interval bet 30. An interval bet 30 in which the particular race participants are selected in such a manner may be referred to as a "value bet," since such bet may provided increased or maximum value to the customer 20. In an alternative embodiment, the same particular race participants are determined for each interval bet 30 associated with a particular race event. In such an embodiment, the possible positions of race participants determined for each intermediate point 104 and/or finish line 108 may be different for different interval bets 30. Thus, multiple customers 20 placing interval bets 30 on the race event are assigned the same race participants, but different possible positions at each intermediate point 104 and/or finish line 108, such that the results of the multiple interval bets 30 are (or may be) different.

Like the particular race participants determined for an interval bet 30, the particular possible positions determined for each intermediate point 104 and/or the finish line 108 of a race event may be determined in any suitable manner. For example, one or more of the particular race participants may be selected by the customer 20 placing the interval bet 30. As another example, one or more of the particular race participants may be randomly selected by betting system platform 16. As another example, one or more of the particular race participants may be otherwise determined by betting system platform 16 or otherwise determined by a bet-providing entity, such as a race track, OTB entity, or tote entity, for example.

An interval bet 30 may include one or more single-point bet components 32 and/or one or more multi-point bet components 32. A single-point bet component 32 corresponds with a single intermediate point 104 in a race event. Thus, a single-point bet component 32 corresponding with a particular intermediate point 104 in a race may comprise a bet on whether one or more particular race participants are positioned in one or more particular possible positions determined for the particular intermediate point 104. Various parameters of each single-point bet component 32 may define how to determine whether that single-point bet component 32 is a winning bet, such as (a) the number of particular race participants that must be actually positioned in the particular possible positions, and (b) whether such particular race participants must finish in such particular possible positions in a particular order. In certain embodiments, various interval bets 30 may include a single bet component 32 covering an individual intermediate point 104, multiple bet components 32 each covering a particular intermediate point 104, a single bet component 32 covering multiple intermediate points 104, multiple bet components 32 each covering multiple intermediate points 104, or any other number of bet components 32 each covering any number and combination of intermediate points 104.

As an example, with reference to FIG. 3, a single-point bet component 32 corresponding with intermediate point 104*c* may comprise a bet on whether three particular race participants are positioned in three particular possible positions determined for intermediate point 104*c*. In order for the example single-point bet component 32 to be a winning bet, the three particular race participants must be actually positioned in the three particular possible positions, in a particular order. The one or more particular race participants and the one or more particular possible positions may be determined in various manners. For instance, as discussed below in greater detail, one or more of such particular race participants and/or particular possible positions may be selected by a customer or randomly determined by betting system platform 16.

In contrast, a multi-point bet component 32 corresponds with multiple intermediate points 104 and/or the finish line 108 of a race event. Thus, a multi-point bet component 32 corresponding with a group of intermediate points 104 and/or the finish line 108 of a race may comprise a bet on whether one or more particular race participants are positioned in one or more particular possible positions determined for the particular intermediate points 104 and/or the finish line 108. Various parameters of each multi-point bet component 32 may define how to determine whether that multi-point bet component 32 is a winning bet, such as (a) the number of particular race participants that must be actually positioned in the particular possible positions determined for each of the particular intermediate points 104 and/or the finish line 108, (b) whether such particular race participants must finish in such particular possible positions in a particular order, and (c) the number and identity of particular intermediate points 104 (and/or the finish line 108) for which such particular race participants must be positioned in the correct possible positions.

As an example, with reference to FIG. 3, a multi-point bet component 32 corresponding with intermediate points 104*b*, 104*d*, 104*f* and finish line 108 may comprise a bet on whether three particular race participants are positioned in three particular possible positions determined for intermediate points 104*b*, 104*d*, 104*f* and finish line 108. In this example, in order for the multi-point bet component 32 to be a winning bet, at each of intermediate points 104*b*, 104*d*, 104*f* and finish line 108, at least one of the three particular race participants must be positioned in one of the three particular possible positions determined for that intermediate point 104 or finish line 108. As discussed above, the one or more particular race participants and the one or more particular possible positions may be determined in various manners, such as being selected by a customer or randomly determined by betting system platform 16.

Two-Dimensional Bet Matrix

Figure 4:
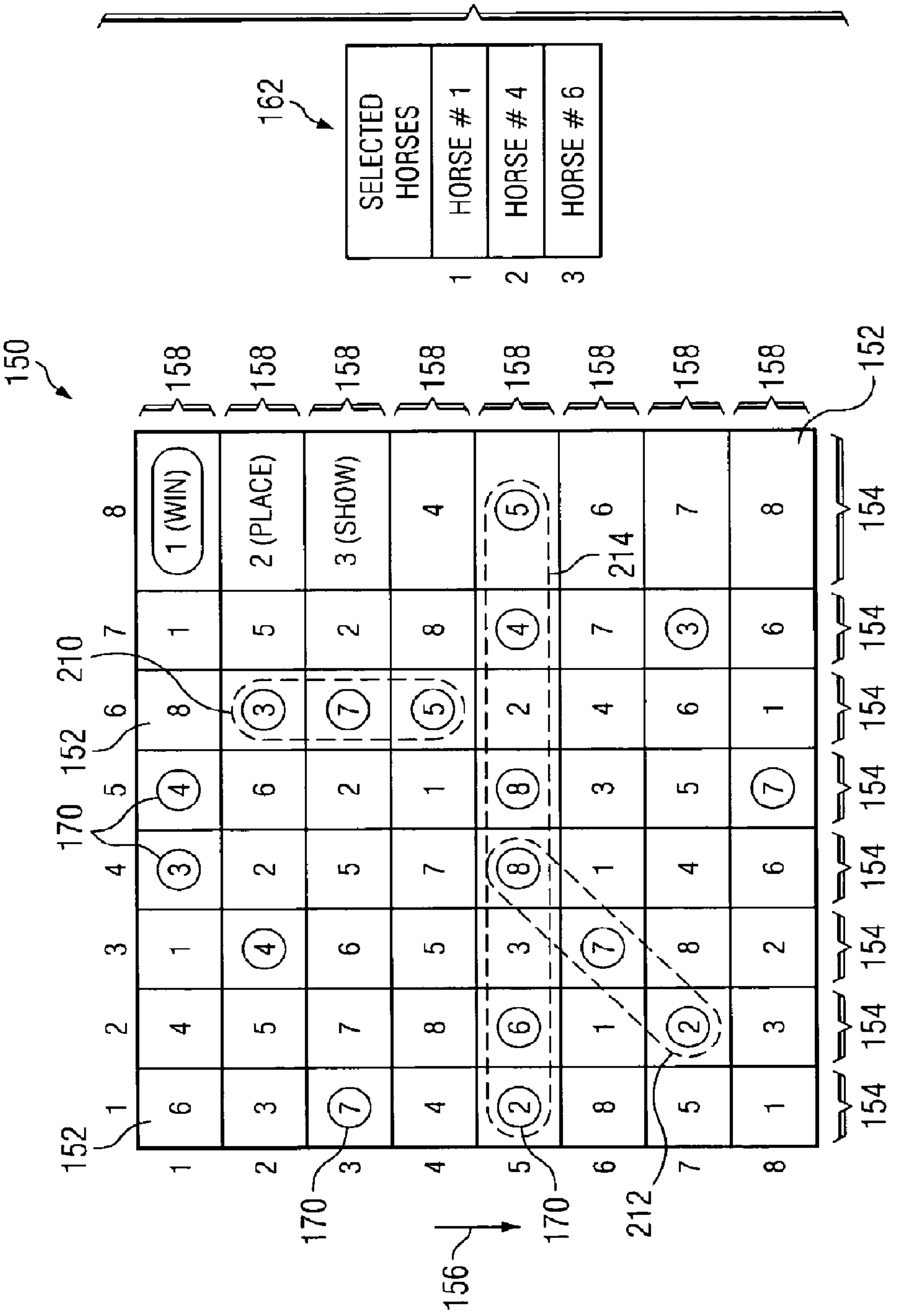
FIG. 4 illustrates an example two-dimensional bet matrix that at least partially defines one or more bet components of an interval bet in accordance with an embodiment.

In some embodiments, betting system platform 16 generates a bet matrix 150 which at least partially defines the one or more bet components 32 of an interval bet 30. FIG. 4 illustrates an example two-dimensional bet matrix 150 that comprises a number of entries 152 arranged in a plurality of columns 154 extending in a first direction 156 and a plurality of rows 158 extending in a second direction 160.

Bet matrix 150 may include one column 154 corresponding with each intermediate point 104 and one column 154 corresponding with the finish line 108 of a particular race event. In the example bet matrix 150 shown in FIG. 4, each of columns #1-#7 corresponds with one of seven intermediate points 104*a*-104*g* of a race event, respectively, and column #8 corresponds with the finish line 108 of the race event. For each column 154, the entries 152 in that column 154 are numbers representing possible positions of race participants at the intermediate point 104 (or finish line 108) corresponding with that column 154. In some embodiments, some or all of the numbers (representing possible positions) in each column 154 are determined randomly by betting system platform 16. The remaining numbers in each column 54 (if any) may be determined by a customer 20.

Bet matrix 150 may include any number of rows 158 depending on the type of the interval bet 30 associated with the bet matrix 150. For some interval bets 30, bet matrix 150 includes the number of rows 158 equal to the number of possible positions at each intermediate point 104 or the finish line 108, which equals the number of race participants in the race event. For instance, for an interval bet 30 regarding a horse race having nine participating horses, the bet matrix 150 for the interval bet 30 may include nine rows 158 such that each column 154 may include numbers representing each of the nine possible positions of each horse in the race. For other interval bets 30, bet matrix 150 includes less rows 158 than the number of possible positions (or race participants) in the race event. For instance, for an interval bet 30 regarding a horse race having 12 participating horses, the bet matrix 150 for the interval bet 30 may include only three rows 158 such that each column 154 may include three numbers representing only three of the 12 possible positions of each horse at that intermediate point 104 or finish line 108.

The example bet matrix 150 shown in FIG. 4 includes eight rows 158, namely rows #1-#8. The entries 152 in each column #1-#8 are numbers representing the first eight possible positions of race participants at the intermediate point 104 (or finish line 108) corresponding with that column 154. In this example, the entries 152 in columns #1-#7 are randomly determined possible positions, and the entries 152 in column #8 (corresponding with the finish line 108) are the first eight possible positions in order from 1 to 8. In other embodiments, the entries 152 in any of columns #1-#8 may be otherwise determined. For example, the entries 152 in all of the columns 154 in bet matrix 150 (including a column 154 corresponding to the finish line 108) may be randomly determined. In another example, the entries 152 in all columns 154 in bet matrix 150 may be determined by the customer 20. In still other embodiments, a portion of the entries 152 are randomly determined by platform 16 while the others are determined by the customer 20.

An indication of the one or more particular race participants determined for an interval bet 30, indicated as particular race participants 162, may be associated with bet matrix 150. Particular race participants 162 for interval bet 30 may be determined from the group of race participants in the race event in any suitable manner, such as being selected by the customer 20 placing the interval bet 30 or randomly determined by betting system platform 16, for example. In the example embodiment shown in FIG. 4, the particular race participants 162 determined for an interval bet 30 are three horses—Horses #1, #4 and #6—selected from ten horses (Horse #1-Horse #10) in a particular horse race.

As discussed above, bet components 32 may comprise bets on whether one or more particular race participants are positioned in one or more particular possible positions determined for one or more particular intermediate points 104 or finish line 108. Bet matrix 150 may define various types of bet components 32 for an interval bet 30 based on the occurrence and/or location of "matched" entries 170 within bet matrix 150. A matched entry 170 is an entry 152 in which one of the determined particular participants 162 is positioned in the possible position indicated by that entry 152. For example, if a particular entry 152 in a particular column 154 contains the number "3" (indicating 3rd place), the entry 152 is a matched entry 170 if one of the particular participants 162 is positioned in 3rd place at the intermediate point 104 (or finish line 108) corresponding with the particular column 154.

For some interval bets 30 or bet components 32, an entry 152 is a matched entry 170 if any of the particular participants 162 is positioned in the possible position indicated by that entry 152. For example, in the example shown in FIG. 4, entry 152 located at column #1, row #1 (i.e., number "6") is a matched entry 170 if any of Horses #1, #4 and #6 is positioned in 6th place at the first intermediate point 104*a* in the race. As another example, entry 152 located at column #3, row #4 (i.e., number "5") is a matched entry 170 if any of Horses #1, #4 and #6 is positioned in 5th place at the third intermediate point 104*c* in the race.

For other interval bets 30 or bet components 32, an entry 152 is a matched entry 170 only if a particular one of the particular participants 162 is positioned in the possible position indicated by that entry 152. For example, for some interval bets 30 or bet components 32, the particular participants 162 must be positioned in a particular order in the possible positions indicated by one or more entries 152. For instance, an example bet component 32 based on the bet matrix 150 shown in FIG. 4 is a winning bet only if the three particular participants 162—Horses #1, #4 and #6—are positioned in order in the three possible positions indicated by the first three entries 152 (i.e., the entries in rows #1-#3) in a column 154. Thus, regarding column #1 of bet matrix 150, (a) Horse #1 must be positioned in 6th place, (b) Horse #4 must be positioned in 3rd place, and (c) Horse #6 must be positioned in 7th place at the first intermediate point 104*a*.

As discussed above, bet matrix 150 may define various types of bet components 32 based on the occurrence and/or location of "matched" entries 170 within bet matrix 150. For example, some bet components 32 are winning bets if a particular number of matched entries 170 are aligned consecutively in direction 156 within a particular column 154. As another example, some bet components 32 are winning bets if a particular number of matched entries 170 are aligned consecutively in direction 160 within a particular row 158. As another example, some bet components 32 are winning bets if a particular number of matched entries 170 are aligned consecutively in a diagonal direction within bet matrix 150. As yet another example, some bet components 32 are winning bets if a particular number of matched entries 170 are aligned consecutively in any direction—vertically, horizontally or diagonally—within bet matrix 150.

The number of matched entries 170 that must be consecutively aligned for such bet components 32 may be any suitable number that is predetermined, randomly determined, determined by a customer 20, or otherwise determined. For some bet components 32, the number of matched entries 170 that must be consecutively aligned is equal to the number of determined race participants 162. Thus, in the example shown in FIG. 3, three matched entries 170 must be consecutively aligned for some bet components 32 to be winning bets. In other examples, the number of matched entries 170 that must be consecutively aligned could be randomly determined by platform 16 when the interval bet 30 is placed. In still other examples, a customer 20 may have the option of choosing the number of matched entries 170 that must be consecutively aligned. The payments 80 for a particular interval bet 30 (or bet component 32) may increase or decrease based on the number of matched entries 170 that must be consecutively aligned. In this regard, an internal bet 30 (or bet component 32) that requires three consecutively aligned matched entries 170 may pay out more than a bet 30 (or bet component 32) that requires two consecutively aligned matched entries 170 but less than a bet 30 (or bet component 32) that requires four consecutively aligned matched entries 170.

As yet another example, some bet components 32 are winning bets if a particular number of matched entries 170 are located in a particular row 158 and need not be aligned consecutively. The number of matched entries 170 required in the same row 158 may be any suitable number that is predetermined, randomly determined, determined by a customer 20, or otherwise determined. As with the number of consecutively aligned matched entries 170 described above, the payouts 80 for a bet component 32 may be based at least in part on the number of matched entries 170 in the same row 158 required to win. For example, in the example shown in FIG. 4, a bet component 32 may be a winning bet if at least five matched entries 170 are located in the same row 158 within bet matrix 150. As yet another example, some bet components 32 are winning bets if a particular number of matched entries 170 are located in a particular column 154 and need not be aligned consecutively. For example, in a bet matrix 150 that includes only three rows 158, a bet component 32 may be a winning bet if at least two matched entries 170 are located in the same column 154 within bet matrix 150. The payouts 80 for a bet component 32 that can win based on matched entries 170 in the same row 158 or column 154 may be less than those for bet components 32 requiring that same number of consecutively aligned matched entries 70.

As yet another example, some bet components 32 are winning bets if a particular number of matched entries 170 are located in the four corners of bet matrix 150. For example, a bet component 32 may be a winning bet if at least three matched entries 170 are located in the four corners of bet matrix 150. As yet another example, some bet components 32 are winning bets only if all of the entries 152 in the bet matrix 150 are matched entries 170. For example, in a bet matrix 150 that includes only one, two or three rows 158, a bet component 32 may be a winning bet only if all of the entries 152 in all of such rows 158 are matched entries 170.

It should be understood that other types of bet components 32 may be otherwise defined based on the occurrence and/or location of any number and combination of matched entries 70 within a bet matrix 150. It should be understood that an interval bet 30 may include any number of bet components 32, including any number of various different types of bet components 32.

Managing Various Types of Bet Components Using a Bet Matrix

To illustrate some example types of bet components 32, suppose an interval bet 30 including four bet components 32 including:

(a) a first bet component 32*a* that is a winning bet if three or more instances of three matched entries 170 aligned in consecutive order either vertically, horizontally or diagonally are located within bet matrix 150;

(b) a second bet component 32*b* that is a winning bet if any row 158 includes at least six matched entries 170;

(c) a third bet component 32*c* that is a winning bet if all eight of the entries 152 in row #1 of bet matrix 150 are matched entries 170; and (d) a fourth bet component 32*d* that is a winning bet if the first three entries 152 in column #8 (i.e., the "win," "place" and "show" positions) of bet matrix 150 are matched entries 170.

FIG. 5 illustrates a table 200 indicating the actual positions 202 of each of the particular race participants 162—Horses #1, #4 and #6—at each intermediate point 104*a*-104*g* and at the finish line 108 of the race. In addition, the columns 154 of bet matrix 150 corresponding to each intermediate point 104*a*-104*g* and the finish line 108 are indicated below table 200 in FIG. 5.

Such actual positions 202 may be received by betting system platform 16 from recording devices 102 and 106 (discussed above) as race results 86. The actual positions 202 in table 200 may be used to identify matched entries 170 in bet matrix 150. For example, as shown in table 200, Horse #1 is positioned in 2nd place at intermediate point 104*a*. Thus, the entry 152 at column #1, row #5 of bet matrix 150 (see FIG. 4) is a matched entry 170 since that entry 152 is a "2," which indicates 2nd place. Further, Horse #4 is positioned in 7th place at intermediate point 104*a*. Thus, the entry 152 at column #1, row #3 of bet matrix 150 is a matched entry 170 since that entry 152 is a "7," which indicates 7th place. Further, Horse #6 is positioned in 12th place at intermediate point 104*a*. Since the entries 152 in bet matrix 150 include only numbers 1-8, there are no matched entries in column #1 corresponding to the 12th place position of Horse #6. This process may similarly be used to determine the matched entries 170 (if any) in rows #2-#8 of bet matrix 150. Each matched entry 170 in bet matrix 150 is indicated for illustrative purposes by a circle around that entry 152.

Once the matched entries 170 have been identified in bet matrix 150, results for each of the four bet components 32*a*-32*d* of the example interval bet 30 may be determined as follows:

Regarding the first bet component 32*a*, two instances of three matched entries 170 aligned in consecutive order are identified, including a first instance of three matched entries 170 aligned vertically in column #6, as indicated by dashed line 210, and a second instance of three matched entries 170 aligned diagonally and extending from column #2, row #7 to column #4, row #5, as indicated by dashed line 212. Thus, since first bet component 32*a* required three or more of such instances, first bet component 32*a* may be considered a losing bet.

Regarding the second bet component 32*b*, six matched entries 170 are located in row #5, as indicated by dashed line 214. Thus, since second bet component 32*b* required six or more matched entries 170 in a single row 158, second bet component 32*b* may be considered a winning bet.

Regarding the third bet component 32*c*, only three of the eight entries 152 in row #1 are matched entries 170. Thus, since third bet component 32*c* required all eight entries 152 in row #1 be matched entries 170, third bet component 32*c* may be considered a losing bet.

Regarding the fourth bet component 32*d*, only one of the first three entries 152 in column #8 (i.e., the "win," "place" and "show" positions) are matched entries 170. Thus, since fourth bet component 32*d* required all of the first three entries 152 in column #8 be matched entries 170, fourth bet component 32*d* may be considered a losing bet.

Thus, second bet component 32*b* may be considered a winning bet, while first, third and fourth bet components 32*a*, 32*c* and 32*d* may be considered losing bets. A payout 80 for second bet component 32*b* may be determined based on parimutuel rules or based on predetermined odds, depending on the particular embodiment.

Three-Dimensional Bet Matrix

Figure 6:
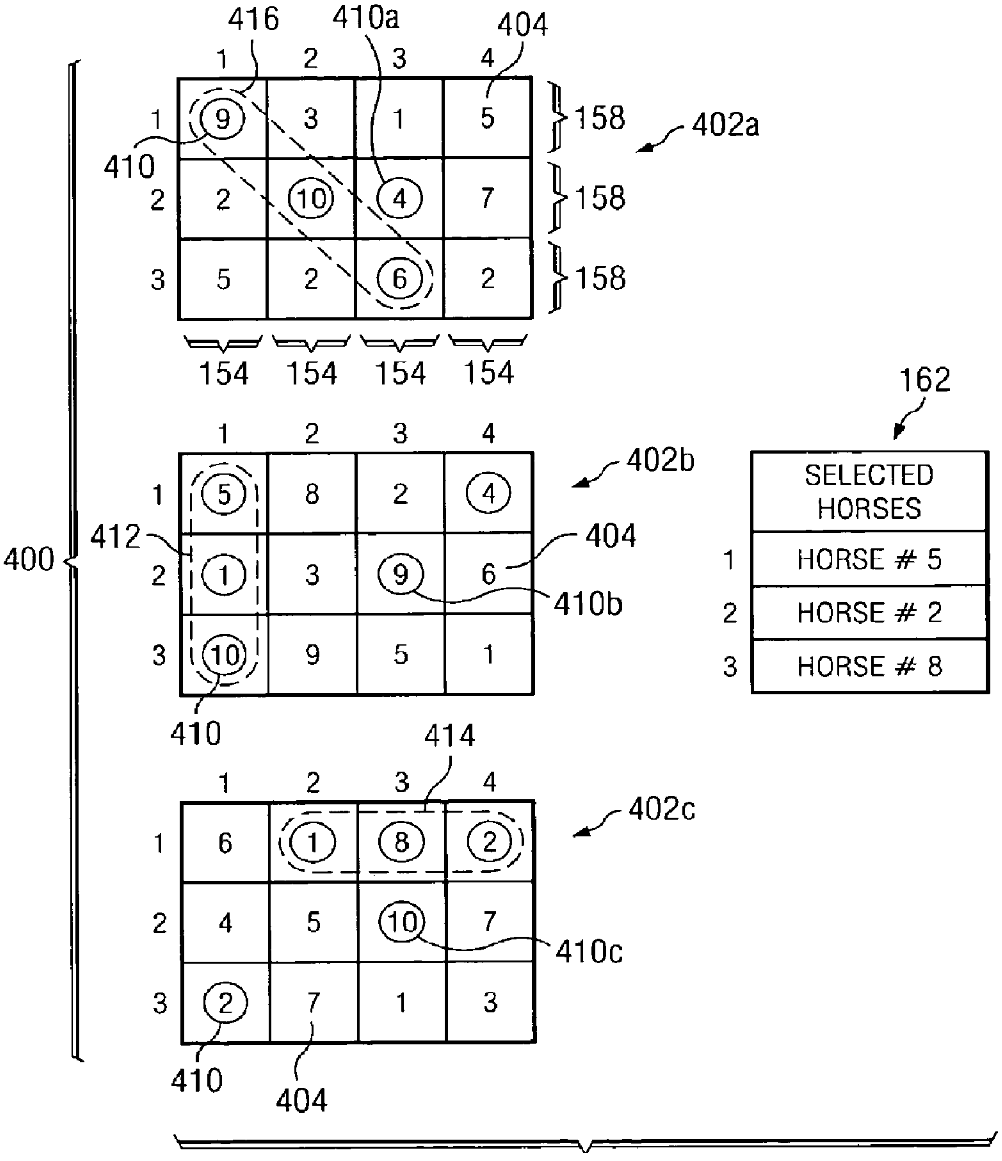
FIG. 6 illustrates an example table indicating the actual positions of particular participants at each intermediate point and at the finish line of a race event.

As discussed above, bet matrix 150 is a two-dimensional bet matrix of entries 152 used to define various bet components 32 of an interval bet 30. However, for some interval bets 30, a three-dimensional bet matrix may be used to define various bet components 32 of an interval bet 30. FIG. 6 illustrates an example three-dimensional bet matrix 400 that comprises a number of two dimensional bet matrices 402. Each two-dimensional bet matrix 402 may be similar to two-dimensional bet matrix 150 discussed above with reference to FIGS. 5-6. Each two-dimensional bet matrix 402 within a three-dimensional bet matrix 400 may correspond to one of a group of race events, such as a groups of races at a particular track in a single day or night, for example. Thus, in the embodiment shown in FIG. 6, three-dimensional bet matrix 400 includes three two-dimensional bet matrices 402*a*, 402*b* and 402*c*, each corresponding to one of three races scheduled to be run at a particular track on a particular night.

Each two-dimensional bet matrix 402*a*, 402*b* and 402*c* includes a number of entries 404 representing possible positions of race participants at an intermediate point 104 and/or the finish line 108 of the race corresponding to that two-dimensional bet matrix 402*a*, 402*b* or 402*c*. As discussed above regarding bet matrix 150, each column 154 in each bet matrix 402 may correspond with an intermediate point 104 or the finish line 108 of the race corresponding to that bet matrix 402. In the embodiment shown in FIG. 6, for each bet matrix 402, columns #1-#3 correspond with an intermediate point 104 in the race corresponding to that bet matrix 402 and column #4 corresponds with the finish line 108 of that race.

Entries 404 that are "matched" are indicated as circled entries 404 in FIG. 6, and denoted as matched entries 410. As discussed above regarding bet matrix 150, each matched entry 410 is an entry 404 in which one of the particular race participants (for example, the three selected horses 162 shown in FIG. 6) is positioned in the possible position indicated by that entry 404 at the intermediate point 104 or finish line 108 corresponding with the column 154 in which that entry 404 is located.

Like two-dimensional bet matrix 150, three-dimensional bet matrix 400 may at least partially define one or more various types of bet components 32 for an interval bet 30. For example, as discussed above regarding bet matrix 150, certain bet components 32 may regard whether a particular number of matched entries 404 are aligned consecutively in a particular direction, such as vertically within a single column 154, horizontally within a single row 158, or diagonally across multiple columns 154 and rows 158. Supposing that example bet components 32 require three or more matched entries 404 aligned consecutively either vertically, horizontally, or diagonally, example winning bets are shown in FIG. 6 by the groups of matched entries 404 indicated by dashed lines 412 (vertical), 414 (horizontal) and 416 (diagonal).

In addition, certain bet components 32 may regard whether a particular number of matched entries 404 are aligned consecutively in a direction perpendicular to the two-dimensional matrices 402. In other words, a particular bet component 32 may require a particular number of matched entries 404 in the same column 154 and row 158 across more than one of the two-dimensional matrices 402. For example, in the embodiment shown in FIG. 7, a particular bet component 32 may require matched entries 404 in the same column 154 and row 158 of each of the three two-dimensional matrices 402*a*, 402*b* and 402*c*. An example winning bet of this type of bet component 32 is shown in FIG. 6 at column #3, row #2 of each matrix 402*a*, 402*b* and 402*c*, as indicated by the group of three matched entries 410*a*, 410*b* and 410*c*.

It should be understood that other types of bet components 32 may be otherwise defined based on the occurrence and/or location of any number and combination of matched entries 404 within bet matrix 400, including groups of matched entries 404 in any direction (for example, horizontal, vertical, or diagonal) within a single two-dimensional matrix 402 or across multiple two-dimensional matrices 402.

Jackpot Bets

In some embodiments, some or all interval bets 30 and/or bet components 32 provided by betting system platform 16 may have a jackpot bet component 94, which may be implemented in various ways. Generally, a jackpot bet component 94 is a relatively (or very) low-odds wager having a relatively (or very) high payout. For instance, regarding a two-dimensional bet matrix 150, example jackpot bet components 94 may comprise bets such as: (1) a bet that all (or a particular minimum number) of the entries 152 in one or more particular rows 158, (b) a particular minimum number of rows 158, or (c) all of the rows 158, of a bet matrix 150 will be matched entries 170; (2) a bet that all (or a particular minimum number) of the entries 152 in (a) one or more particular columns 154, (b) a particular minimum number of columns 154, or (c) all of the columns 154, of a bet matrix 150 will be matched entries 170 (which bet may or may not require the particular race participants to be in a particular order in the possible positions indicated by the entries 152 in each of such particular columns 154); and (3) a bet that a particular minimum number of entries 152 in bet matrix 150 will be matched entries 170. A jackpot bet component 94 may be a particular bet component 32 of an interval bet 30 or may comprise a portion of an interval bet 30 or one or more particular bet components 32 of an interval bet 30.

In some embodiments, a fraction of the wager amount of an interval bet 30 placed by a customer 20 may be assigned to one or more jackpot bet components 94, either automatically or upon selection by the customer 20. For example, a customer 20 may have the option of having a particular percentage of the wager amount of his interval bet 30 allocated to one or more particular jackpot bet components 94. As another example, a particular percentage of the wager amounts of interval bets 30 received from customers 20 may be automatically allocated to one or more particular jackpot bet components 94. For instance, for a one-mile race event having seven intermediate points 104, betting system platform 16 may automatically allocate the wager amount for an interval bet 30 placed by a customer 20 into nine equal portions for nine bet components 32—one for each of the seven intermediate points 104, one for the finish line 108, and one jackpot bet component 94.

In some embodiments, a jackpot bet component 94 may be associated with a rolling pot (or "jackpot pool") that grows over time (e.g., over a number of race events, days, weeks, or years) until a customer 20 has a winning jackpot bet component 94 and wins the jackpot pool. Thus, if there are no winning bets on a particular jackpot bet component 94 for a particular race, the wager amounts allocated to such jackpot bet components 94 may be maintained in a jackpot pool and carried forward to one or more subsequent races. A separate jackpot pool may be maintained for each type of jackpot bet component 94 such that multiple jackpot pools may be maintained simultaneously. Alternatively, a single jackpot pool may be used for multiple (or all) types of jackpot bets 94 offered at a particular track or by betting system platform 16, for example.

In other embodiments, rather than having a rolling jackpot pool, a jackpot bet component 94 may be associated with a single race event. For example, a jackpot bet component 94 may comprise a bet regarding the (1) the number of rows 158 in a bet matrix 150 having a particular number of matched entries 170; (2) the number of columns 154 in a bet matrix 150 having a particular number of matched entries 170; or (3) the total number of matched entries 170 in a bet matrix 150. The interval bet(s) 30 having bet matrices with the greatest number of such rows 158, columns 154, or total matched entries 170 may be deemed as having a winning jackpot bet component 94 and payouts 80 may be awarded to the customer(s) 20 that placed such interval bet(s) 30.

Example Operation of System

Figure 7:
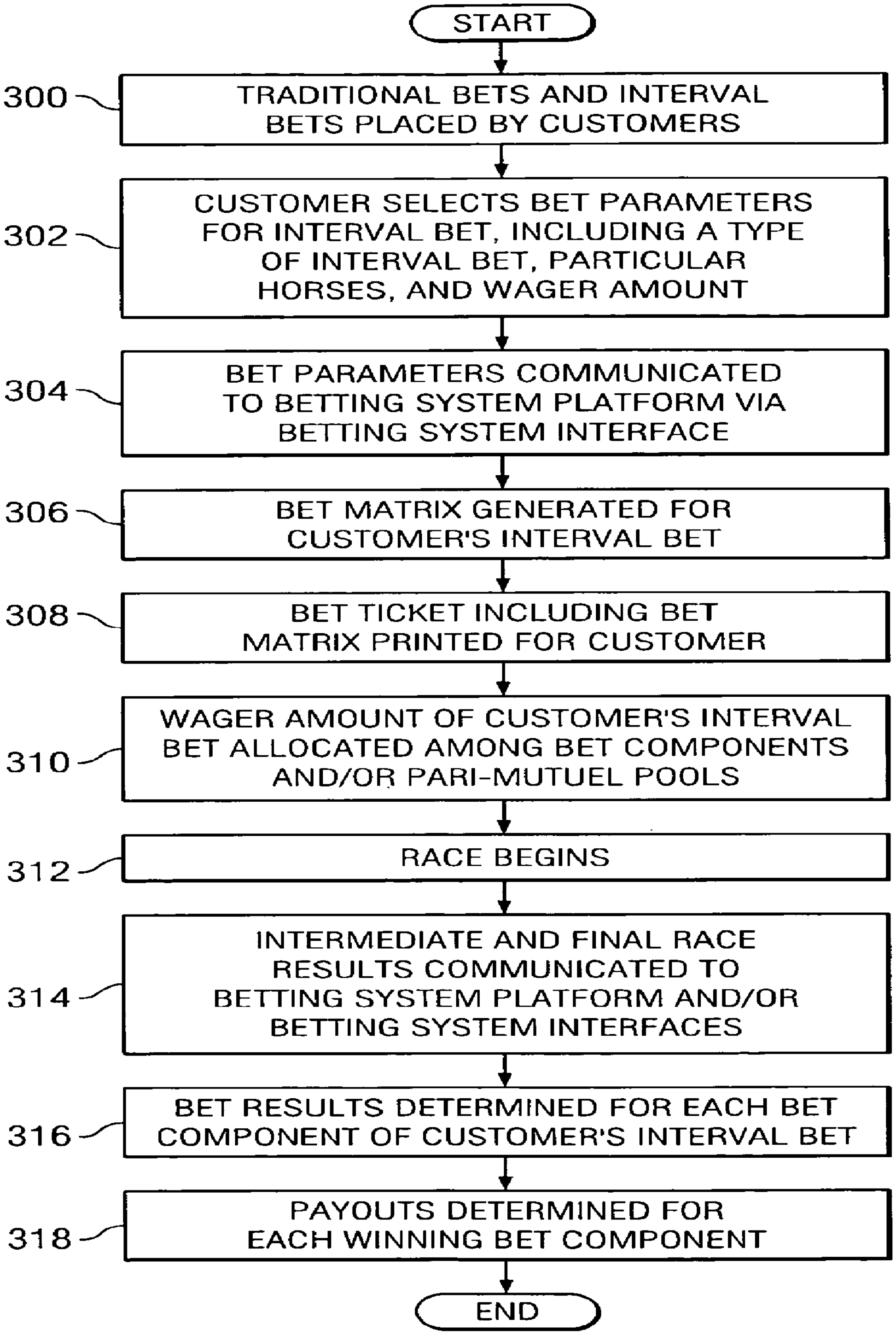
FIG. 7 is a flowchart illustrating an example method of receiving and managing interval bets in accordance with an embodiment.

FIG. 7 is a flowchart illustrating an example method of receiving and managing interval bets 30 in accordance with an embodiment. At step 300, bets 12—including interval bets 30 and/or traditional bets 34—regarding a particular race event are received from customers 20 via one or more betting system interfaces 14, such as described above with reference to FIG. 1.

At steps 302-308, a particular customer 20*a* places an interval bet 30*a* regarding a particular horse race as follows. At step 302, customer 20*a* selects one or more bet parameters 84*a* for an interval bet 30*a*, including, for example, a type of interval bet 30*a*, one or more bet components 32A of the interval bet 30*a*, one or more particular horses from the group of horses scheduled to race in the particular horse race, and/or a wager amount for the interval bet 30*a* or for each bet component 32A of interval bet 30A. In other embodiments, the one or more particular horses for interval bet 30*a* may be otherwise determined, such as randomly determined by betting system platform 16, for example. In this example, suppose customer 20*a* selects two horses, for example Horse #3 and Horse #7. At step 304, customer 20*a* communicates the bet parameters 84*a*, as well as the wager amount, to a betting system interface 14, which communicates the bet parameters 84*a* to betting system platform 16. At step 306, betting system platform 16 generates a bet matrix 150*a* for customer 20*a*'s interval bet 30 based on the received bet parameters 84*a* and various event parameters 82 regarding the particular horse race, such as the length of the race and the number of horses scheduled to compete in the race, for example. In other embodiments, all or portions of bet matrix 150*a* may be generated by customer 20*a*. For example, customer 20*a* may select some or all of the entries 152 of bet matrix 150*a*. In any event, betting system platform 16 may store the generated bet matrix 150*a* in memory 72. At step 308, betting system platform 16 communicates the bet matrix 150*a* to an appropriate betting system interfaces 14, such as a teller 44 or self-service machine 48, for example, such that the betting system interfaces 14 may print a bet ticket 92 for customer 20*a* that includes some or all of the following: (a) a printed version of the bet matrix 150*a*, (b) the wager amount, (c) an indication of the track and particular race event, (d) the scheduled time for the particular race event, and (e) an indication of the two horses (Horse #3 and Horse #7) selected by customer 20*a*. Customer 20*a* may use bet ticket 92 to track the progress of his interval bet 30*a* and determine a result for each bet component 32*a* of interval bet 30*a*, such as discussed below at step 314.

At step 310, betting system platform 16 may allocate the wager amount of interval bet 30*a* among the various bet components 32*a* of interval bet 30*a*. Such allocation may be made (a) according to selections made by customer 20*a* when placing interval bet 30*a*, (b) based on predetermined wager allocation rules maintained by betting system platform 16, or (c) according to other criteria. In some embodiments, betting system platform 16 allocates an equal portion of the wager amount of interval bet 30*a* to each of the bet components 32*a* of interval bet 30*a*. For example, for an interval bet 30*a* having three bet components 32*a*, betting system platform 16 allocates a third of the wager amount to each of the three bet components 32*a*. As another example, for a race event having eight bet components (such as a one mile race having a bet component 32 corresponding to each ⅛ mile of the race, for example), 12.5¢ of each $1.00 wagered on an interval bet 30 may be allocated to each of the eight bet components 32. In some embodiments, betting system platform 16 may automatically allocate the wager amount of an interval bet 30*a* based on the length of the race event or the number of intermediate points 104 in the race event. For example, in a seven-furlong (⅞ mile) race event having intermediate points 104 at each furlong (i.e., each ⅛ mile), betting system platform 16 may automatically allocate the wager amount of an interval bet 30*a* on the race event into sevenths, wherein one-seventh is allocated to each of seven bet components 32 (one corresponding to each of six intermediate points 104 and one corresponding to the finish line 108). In other embodiments, betting system platform 16 and/or a betting system interface 14 may allow customer 20*a* to provide input regarding the allocation of the wager amount of interval bet 30*a* among the various bet components 32*a* of interval bet 30*a*. For example, supposing interval bet 30*a* includes three bet components 32*a*, customer 20*a* may request to allocate 50% of the wager amount to one of the bet components 32*a* and 25% to each of the other two bet components 32*a*. In embodiments in which interval bets 30 are pari-mutuel bets, the allocation of the wager amount to each of the bet components 32*a* of interval bet 30*a* may include allocating the wager amount into one or more pari-mutuel pools. For example, in an embodiment in which a separate pari-mutuel pool is provided for each type of bet component 32*a*, betting system platform 16 may allocate the wager amount into the various pari-mutuel pools according to any of the criteria discussed above.

At step 312, the particular race event begins. At step 314, race results 86 are communicated from the track, an OTB entity, or some other entity to betting system platform 16. Race results 86 may indicate at least the actual positions 202 of each horse in the particular race at each intermediate point 104 and at the finish line 108 of the race. For example, race results 86 may include the type of data in table 200 shown in FIG. 5. In some embodiments, such race results 86 are also communicated to one or more betting system interfaces 14 such that customers 20 may track the progress of the race and/or their bets 12 on the race. In some embodiments, race results 86 are communicated to betting system platform 16 and/or betting system interfaces 14 in real time or substantially in real time.

At step 316, betting system platform 16 may determine a bet result 78 for each bet component 32*a* of interval bet 30*a* based on the received race results 86 regarding the race, bet parameters 84 regarding each bet component 32*a*, and bet matrix 150*a* generated at step 306. For example, betting system platform 16 may determine whether each bet component 32*a* is a “win,” “loss,” “push,” or “no action” using one or more of the techniques discussed above.

At step 318, betting system platform 16 may determine a payout 80 for each bet component 32*a* determined to be a winning bet at step 316. In a pari-mutuel system, betting system platform 16 may determine a payout 80 for each bet component 32*a* according to known methods for determining pari-mutuel payouts. Betting system platform 16 may take out a commission, or “take out,” from the wager amount of the interval bet 30*a* or from the portion of the wager amount allocated to each bet component 32*a*. For example, in some embodiments, such commission or “take out” may be a predetermined percentage (such as 10% for example) of the wager amount. In some instances, payouts 80 determined for customer 20*a* may be paid to customer 20*a* via one or more betting system interfaces 14. Alternatively, betting system platform 16 may update a wagering account for customer 20*a* based on the amounts of such payouts 80.

If it is determined that, for a particular pari-mutuel pool, none of the bet components 32*a* assigned to that pool are winning bets, the wager amounts for such bet components 32*a* may be returned to the customers 20 who placed such bets, carried forward to a new pari-mutuel pool associated with a subsequent race, or otherwise handled.

It should be understood that the example method described above may also apply to interval bets 30 using other type of bet matrices, such as a three-dimensional bet matrix 400, within the scope of various embodiments. It should also be understood that in various embodiments, the steps of the methods shown in FIG. 7 may be performed in any suitable order and may overlap in whole or in part without departing from the scope of various embodiments. In addition, various steps and methods shown in FIG. 7 may be performed in serial or parallel, notwithstanding the example representations shown in FIG. 7.

Although embodiments are described in detail, a person skilled in the art could make various alterations, additions, and omissions without departing from the spirit and scope of various embodiments.

Pick N Examples

Some embodiments may include pick N style or other multi component bets. It should be recognized that races and bet styles in races are non-limiting examples only and that other embodiments may include any type of event (e.g., a sporting event such as football) and any type of betting styles (e.g., inrunning, parlay, etc.). Various examples related to such betting styles are described herein as examples and may be used together with any embodiment in any combination. Components described in such embodiments may be used together in any combination. For example, a red/black/green group bet pick n style wager may be available in some embodiments, a pick n style in running daily n may be available is some embodiments, and so on.

Figure 8:
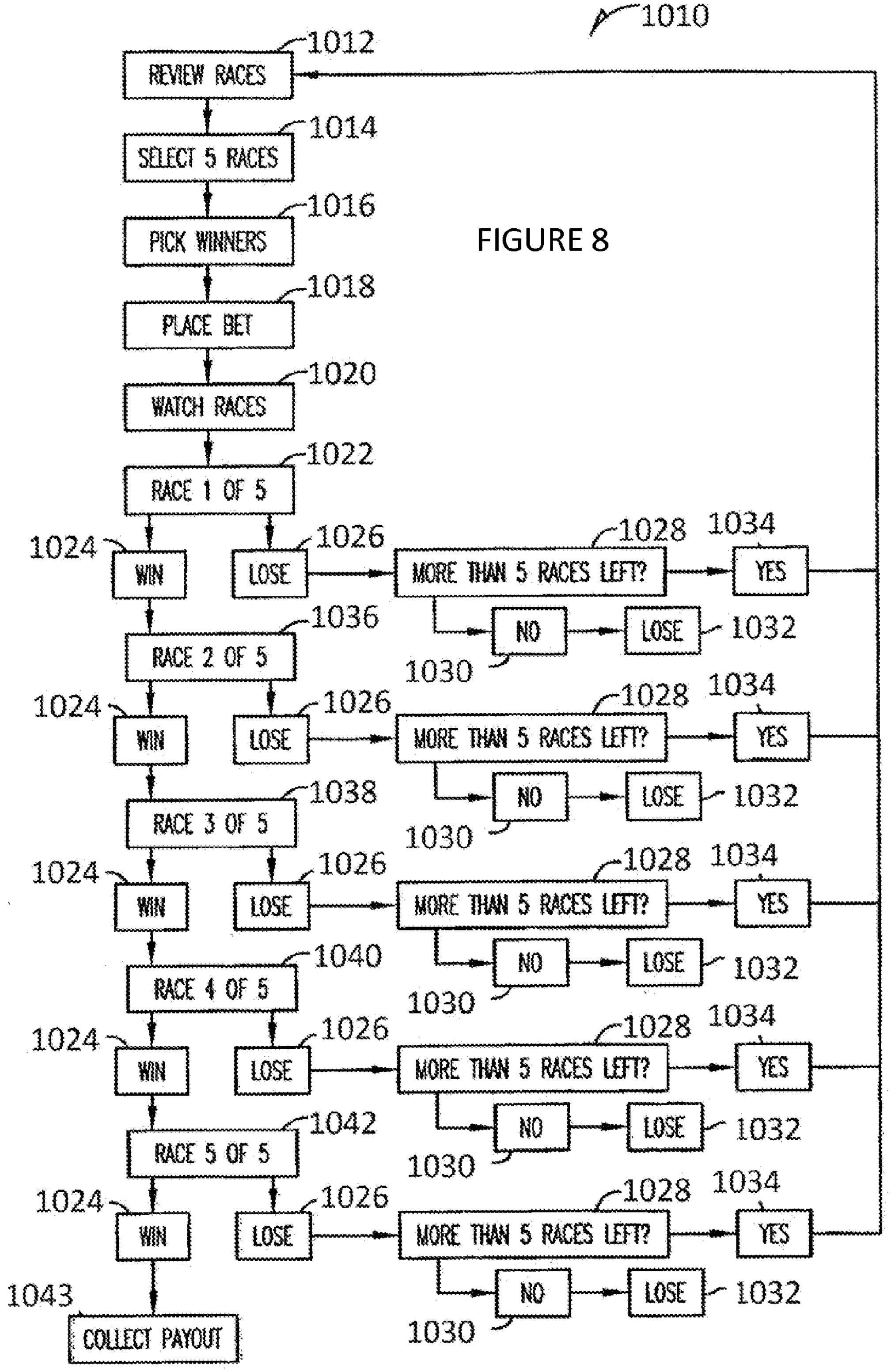
FIG. 8 is a flow chart diagram of an embodiment.

Referring to FIG. 8, some embodiments include a method of gaming 1010 in which the player is allowed to select the races on which to include in a Pick(n) style bet. Pick(n) style betting can be established for any number of races, but for simplicity purposes herein, a Pick 5 game shall be used.

The Pick 5 game 1010 the present invention allows a player to review the races 1012 of a racing event and select any five races 14. For example, if an event has ten races, the player may choose to use races 1,4,5,7, and 10 as the races for his Pick 5 game. After the player has selected the five races 1014, he must pick the winners 1016 of each of those five races. A player may indicate a single horse or multiple horses for each race.

Figure 9:
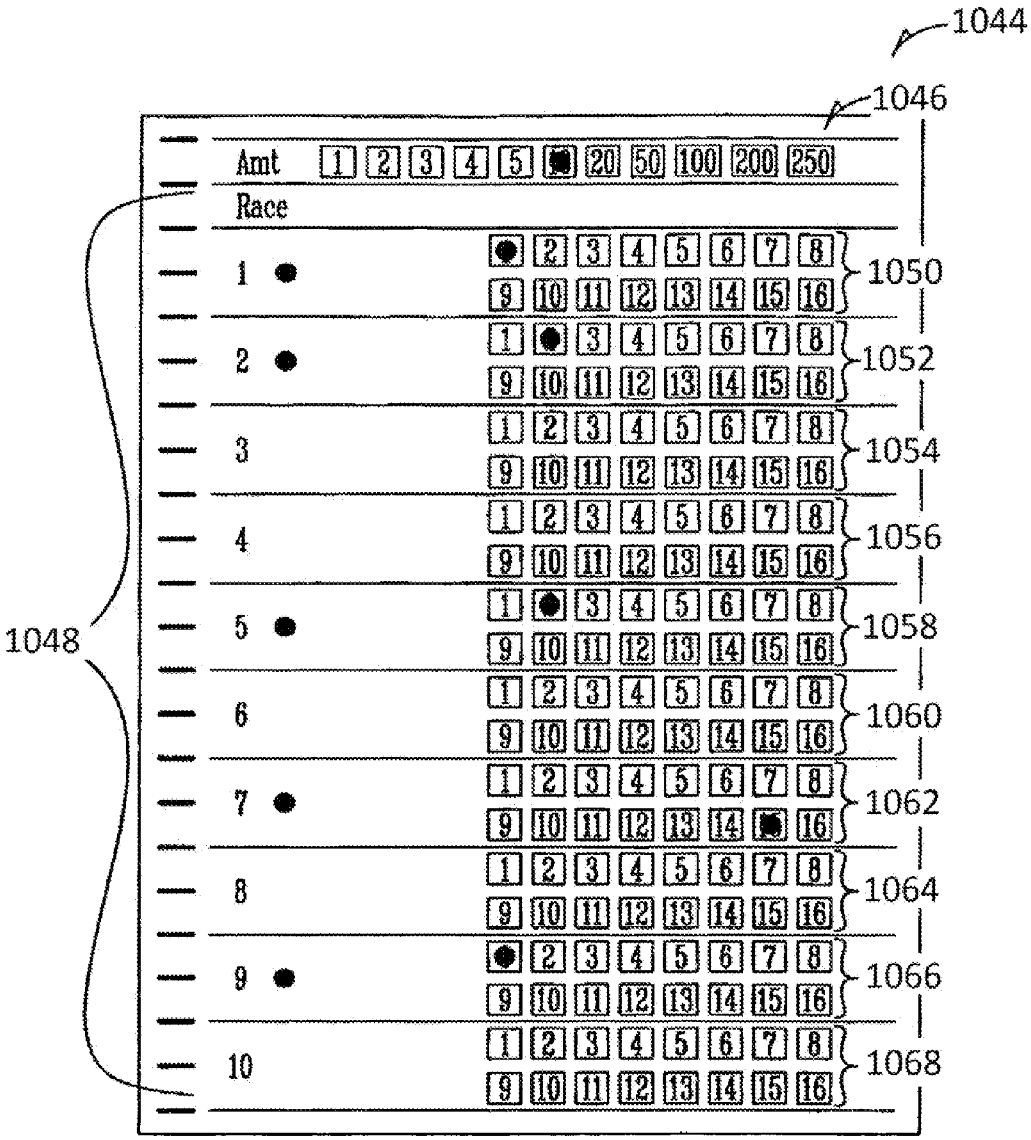
FIG. 9 is a diagram of a wager card.

Once the player has chosen his races 1014 and picked the winners 1016, the player visits a teller window at the racetrack and wagers 1018 a desired amount of money for the Pick 5. Typically, the player communicates with the teller verbally. However, in Pick games, the player's bet is preferably recorded on a game card 1044, such as is shown in FIG. 9. A typical game card 1044 includes an area for the player or teller to mark how much money is being wagered 1046, an area to indicate what races the player has selected for the Pick 5 1048, and an area to indicate which horse or horses for the selected race the player believes will win. 1050-1068. For example, the player of the card 1044 shown in FIG. 10 has wagered ten dollars on a Pick 5 game. The player has selected races 1,4, 5,7, and 10 in the race area 1048. In race 1, the player believes horse 1 will win and a circle is darkened in the horse area 1050 to indicate the player's selection. In race 2 the player believes the player's selections have been recorded in the appropriate horse selection areas 1050, 1052, 1058, 1062 and 1064 and the player's wager is complete. After wagering, the player can enjoy the races 1020 and play more.

Here, the player has wagered that a certain horse will win the first race 1022, a certain horse wm win the fourth race 1036, fifth 1038, seventh 1040 and tenth 1042 races. If the player's selected winner actually wins 1024 the first race 1022, the player can relax and wait until the fourth race 1036. However, if a player's selected winner does not win 1026 the first race 1022, the player may determine if there are still more than the Pick(n) number of races left 1028. Since the player here is playing a Pick 5, if his horse did not win 1026 the first race 1022, there are still nine races left. The player can wager again and still try and select the winners of any five remaining races for the event.

If there are more than five races left 1034, the player can review the remaining races 1012, select five 1014 new races to include in his Pick 5, select whom he believes will win 1016 those races, place his wager 1018 and continue to watch and enjoy the remaining races 1020. This process can continue until there are fewer races left than the number of races required for the Pick(n) wager 1030. In this case, the player can continue to participate in the Pick 5 game until betting has closed for the fifth to last race. After the fifth to last race, if the player's selected winner does not win the race 1026, there are fewer than five races left 1028, so the player can no longer place another bet 1030 and the player will lose 1032 the Pick 5 game.

Figure 10:
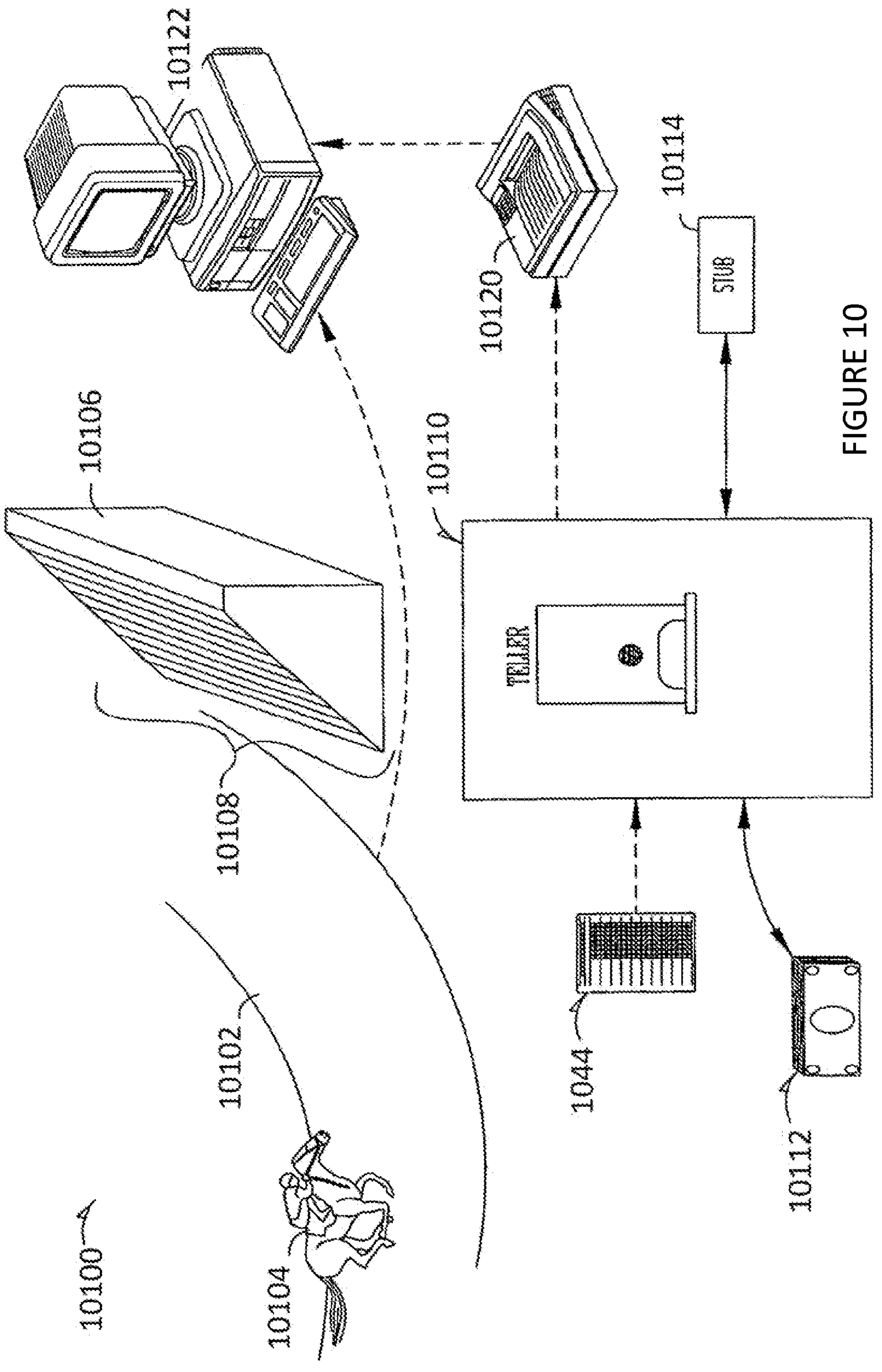
FIG. 10 is a schematic diagram of a typical race track wager.

FIG. 10 shows a typical computer assisted way 10100 to administer betting on a number of races within a racing event. Initially, all of the racing events are published, either electronically or in print form. In the Pick 5 scenario, the player selects a subset of five' races to wager on and selects his predicted winners for each of these races. A player fills out a card 1044 or simply tells the teller 10110 what the player's wager is and deposits an amount of money 10112. Preferably, the minimum wager amount is one dollar. In one embodiment of the invention, all of the players' wagers are collected together into a Pick 5 pool. The money put into the pool is divided up by all of the winners after the completion of the racing event, minus the published takeout.

The teller provides the player with a receipt or stub J 1014 to confirm the wager. From the teller, the wager is processed by a tote system. Typically, a tote system includes a betting terminal 10120, computer 10122, and other servers 10124 along with the usual display and input devices and the software necessary to manage the system. Tote systems are commonly available today from such sources as United Tote and others. These systems process wagers and calculate and display odd/) and payoff information.

During the race 10104, the fans can observe from the grandstands 10108 or any other area in view of the racetrack 10102. The race results are determined by the judges or stewards and entered into the mainframe 10124. Once the results are made official, the finish order is entered into the computer 10122. After completion of all of the event's races, the tote system calculates the winners of the Pick 5 wager by determining if one or more players have correctly selected each winner of the five races selected. Once the winners have been identified, they can return their ticket or stub 10114 and collect their portion of the prize money.

For example, if thirty people have correctly selected the five winners of their five selected races, all thirty will split the money in the pool. If there is no winner, consolation prizes may be awarded according to the jurisdictional rules, for example, the Rules of the Iowa Racing & Gaming Commission.

Those skilled in the art will recognize and be able to practice additional variations in the methods and systems described which fall within various embodiments. For example, wagers may be made through mobile device interfaces that interact with a central system.

Select N Examples

Some embodiments may include select N style or other multi component bets. It should be recognized that races and bet styles in races are non-limiting examples only and that other embodiments may include any type of event (e.g., a sporting event such as football) and any type of betting styles (e.g., inrunning, parlay, etc.). Various examples related to such betting styles are described herein as examples and may be used together with any embodiment in any combination. Components described in such embodiments may be used together in any combination.

Figure 11:
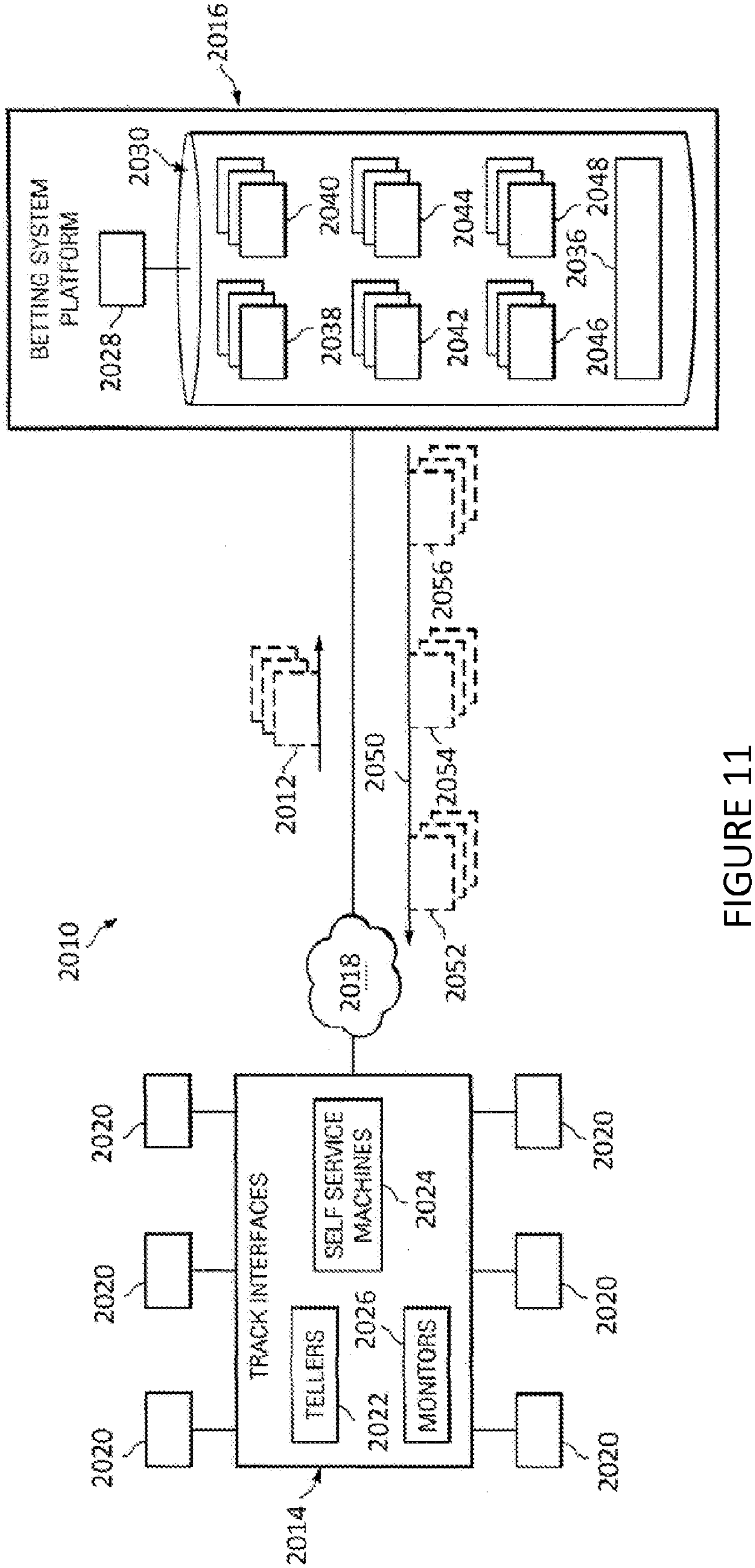
FIG. 11 illustrates a system for receiving and managing Select Five bets, in accordance with an embodiment of the present invention.

FIG. 11 illustrates an example system 2010 for receiving and managing bets 2012 in accordance with an embodiment. System 2010 includes track interfaces 2014 and a betting system platform 2016 coupled by a communications network 2018. In general, one or more bettors 2020 may receive betting information (such as race times, betting rules, betting options and odds, for example) and/or place bets 2012 via track interfaces 2014. Track interfaces 2014 communicate such bets 2012 received from bettors 2020 to betting system platform 16. Betting system platform 2016 stores the received bets 2012, determines appropriate odds and payouts and communicates such odds and payouts to track interfaces 2014.

In a given day, a horseracing track may be scheduled to run any number of races. Various types of races may be held the same day, such as races of various lengths and races for horses of various types and/or ages. On most race days, the track will be scheduled to hold more than five races. System 2010 permits bettors 2020 to select five races out of those scheduled for a particular day and to bet on the winners of the five races selected. Such a bet may be referred to as a "Select Five" bet, and bets 2012 may be referred to herein as Select Five bets 2012. The five races selected may be consecutive or nonconsecutive races. Different bettors 2020 may choose different races to constitute their selected five races of their respective Select Five bets. For example, if nine races are scheduled to be run on a particular day, one bettor 2020 may select Race 1, Race 2, Race 4, Race 5 and Race 8, while another bettor 2020 may select Race 5, Race 6, Race 7, Race 8 and Race 9. Each such bettor 2020 will also select a winner for each race chosen. A winning Select Five bet may constitute one that correctly selects the winning horse of each of the five races selected by the bettor in the bettor's Select Five bet. It is possible that a track may have multiple Select Five bet winners in a particular day, and those winners may have selected different races on which to bet in their respective Select Five bets.

System 2010 is preferably a pari-mutuel betting system in which all Select Five bets 2012 received in a day are pooled, a commission (or "take-out") is taken by the track or other wagering provider, and the remainder constitutes the Select Five payout and is distributed among all winning Select Five bettors.

Track interfaces 2014 may include any suitable track interface between a bettor 2020 and betting system platform 2016, such as tellers 2022 and self-service betting machines 2024, which may receive bets 2012 from and distribute payouts to bettors 2020. Track interfaces 2014 may also include monitors 2026, which may be viewed by bettors 2020 to monitor betting information such as race times, schedule, current odds and projected or actual payouts for Select Five bets 2012, for example. In some situations, such information may be updated substantially in real time or at preset intervals (such as every 30 seconds, for example) as new Select Five bets 2012 are placed and/or as information regarding the races changes, for example.

A bettor may place a Select Five bet 2012 at a track interface 2014 on a day up until the point when there are fewer than five races remaining. For example, if there are 11 races scheduled for a particular day, a Select Five bet may be placed at anytime before betting has closed for Race 7. Note that in this example if a bettor waits until after Race 6 to place a Select Five bet, then the bettor must select the winners of Races 7, 8, 9, 10 and 11 in the bettor's Select Five bet. This enables bettors who may have selected earlier races in the day in a Select Five bet and missed selecting the winning horses of any of those races to place one or more additional Select Five bets encompassing five of the remaining races to be run in the day. Thus, such bettors still have a chance to win the Select Five payout for the day.

As discussed above, betting system platform 2016 is operable to receive Select Five bets 2012 from track interfaces 2014, store the received bets 2012, determine appropriate payouts and communicate such payouts to the track interfaces 2014, which may then display such payouts to bettors 2020. As shown in FIG. 11, betting system platform 16 includes a processor 2028 coupled to a memory 2030. Processor 2028 is generally operable to execute various algorithms or calculations to determine current Select Five pool data 2052, current odds data 2054, current or potential Select Five payout data 2056, and any other suitable information.

As discussed above, betting system platform 2016 comprises processor 2028 and memory 2030. Processor 2028 may comprise any suitable processor, such as a central processing unit (CPU) or other microprocessor, that executes a betting system software application 2036 or other computer instructions and may include any suitable number of processors working together. Memory 2030 may comprise one or more memory devices suitable to facilitate execution of the computer instructions, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers or microprocessors.

Memory 2030 is generally operable to store various information that may be used by processor 2028 in determining odds and/or payouts. For example, memory 2030 may comprise any suitable number of databases, which may be co-located or physically and/or geographically distributed. In the example shown in FIG. 11, memory 2030 may store any or all of the following: betting system software application 2036, current odds data 2038, race parameters 2040, Select Five bet parameters 2042, Select Five calculation rules 2044, race results 2046 and Select Five bet results 2048.

Race parameters 2040 may comprise various parameters of one or more races, such as, for example, the type of race, the time of the race and/or the number (or in some cases, the name) of each of the horse in the race. Select Five bet parameters 2042 may comprise various parameters of one or more received Select Five bets 2012, such as the identity of the bettor 2020 who placed the Select Five bet 2012, the commission rate on the Select Five bet 2012, the races covered by the Select Five bet 2012, the horses covered by the Select Five bet 2012 and/or the amount of the Select Five bet 2012, for example. Select Five calculation rules 2044 may comprise various equations or other algorithms to be used by processor 2028 in determining various current Select Five pool data 2052, current odds data 2054 and current or potential Select Five payout data 2056. Race results 2046 may comprise various data regarding the results of one or more races, such as the winner of each race in a given day, for example. Select Five bet results 2048 may comprise various data regarding the results of various Select Five bets 2012, such as the identity of the bettor 2020 who placed the Select Five bet 2012, whether the Select Five bet 2012 was a winning bet, the determined payout for the Select Five bet 2012 and/or whether the payout was distributed to the bettor 2020, for example. It should be understood that particular components stored in memory 2030 may be combined or separated in any suitable manner in memory 2030 according to particular needs. As an example, FIG. 12 further discussed below illustrates an example of Select Five Bet and Result Data, which may combine data from Select Five bet parameters 2042, race results 2046 and Select Five bet results 2048.

As discussed above, one or more communications networks 2018 couple and facilitate wireless and/or wireline communication between track interfaces 2014 and betting system platform 2016. Each communication network 2018 may include one or more servers, routers, switches, repeaters, backbones, links and/or any other appropriate type of communication devices coupled by links such as wire line, optical, wireless or other appropriate links. In general, each communication network 2018 may include any interconnection found on any communication network, such as a local area network (LAN).

As discussed above, processor 2028 is operable to execute betting system software application 2036 to determine current Select Five pool data 52, current odds data 2054 and current or potential Select Five payout data 2056. Processor 2028 may determine such pool, odds or payout data based at least on data received from memory 2030 and/or track interfaces 2014. In addition, processor 2028 may update such pool, odds or payout data based on new information being received by betting system platform 2016. In some embodiments, processor 2028 may update such data in real time, substantially in real time, or at preset intervals (such as every 30 seconds, for example).

As illustrated in FIG. 11, current Select Five pool data 2052, current odds data 2054 and current or potential Select Five payout data 2056 may be communicated to track interfaces 2014 via communications network 2018, as indicated by arrow 2050. Such data may then be made available to bettors 2020, such as via monitors 2032.

FIG. 12 illustrates example Select Five bet and result data for a particular day at a track. It should be understood that while a bettor may select more than one horse per race (e.g., at an incremental cost), the illustrated example assumes the bettors selected only one horse per race. In the example, the track is scheduled to run ten races, and Bettors 1-4 each make Select Five bets. Bettor 1 selects to bet on Races 2, 5, 7, 8 and 10; Bettor 2 selects to bet on Races 1, 2, 3, 4 and 5; Bettor 3 selects to bet on Races 1, 3, 4, 5 and 7; and Bettor 4 selects to bet on Races 4, 5, 6, 7 and 10. Bettor 1 selects Horse #2 to win Race 2, Horse #6 to win Race 5, Horse #1 to win Race 7, Horse #2 to win Race 8 and Horse #3 to win Race 10. Bettor 2 selects Horse #3 to win Race 1, Horse #2 to win Race 2, Horse #8 to win Race 3, Horse #5 to win Race 4 and Horse #6 to win Race 5. Bettor 3 selects Horse #4 to win Race 1, Horse #8 to win Race 3, Horse #5 to win Race 4, Horse #6 to win Race 5 and Horse #1 to win Race 7. Bettor 4 selects Horse #5 to win Race 4, Horse #8 to win Race 5, Horse #7 to win Race 6, Horse #7 to win Race 7 and Horse #6 to win Race 10. In the example, Horse #4 wins Race 1, Horse #2 wins Race 2, Horse

#8 wins Race 3, Horse #5 wins Race 4, Horse #6 wins Race 5, Horse #6 wins Race 6, Horse #1 wins Race 7, Horse #2 wins Race 8, Horse #4 wins Race 9 and Horse #3 wins Race 10.

Comparing the races and horses selected to the actual race winners, one can see that Bettors 1 and 3 accurately selected the winners of each race they respectively selected in their Select Five bets. Bettor 2 accurately selected the winners of four out of five selected races (correctly selected the winners of Races 2, 3, 4 and 5 but missed the winner of Race 1). Bettor 4 accurately selected the winner of one out of five selected races (correctly selected the winner of Race 4 but missed Races 5, 6, 7 and 10). Thus, Bettors 1 and 3 would each receive a portion of the total Select Five payout for that particular day at the track. If Bettors 1 and 3 were the only Select Five winners for that day, then they would divide the total Select Five payout for the day, for example on a per dollar wagered basis.

It is possible that in a particular day a track may not have any Select Five bets that correctly select the winners of five respectively selected races. In those cases, the track may pay some or all of the Select Five payout for that day to Select Five bettors who correctly select the most of their five races (e.g., some or all of the Select Five payout may be split among bettors correctly selecting four out of their five respectively selected races). In some cases, the track may pay no Select Five bettors for a particular day if no bettor correctly picks the winners of all five of the bettor's selected races.

It should be understood that in the event that any payout is made to a plurality of Select Five bettors picking the same number of races correctly, the payout will be divided among such Select Five bettors according to dollars wagered by each such bettor. For example, if two Select Five bettors correctly select the winners of all five races respectively selected and one such bettor wagered $1 for his winning Select Five bet while the other Select Five bettor wagered $2 for his winning Select Five bet, then the Select Five bettor that wagered $2 will receive twice the amount of the Select Five payout received by the bettor that wagered $1.

Any portion of the Select Five payout for a particular day not paid by the track that day (e.g., if there are no Select Five bets that correctly pick the winners of five selected races and the full Select Five payout for the day is not distributed to bettors correctly picking less than five selected races) may carry over to a future racing day, such as the next racing day, to be combined with the Select Five bets placed on such future racing day to constitute the future racing day's Select Five payout. Such a carryover may occur multiple days if some or all of multiple days' Select Five payouts are not paid on such days. It should be understood that in the event that no Select Five bettors in a particular day correctly select the winners of five selected races and the track still pays a portion of that day's Select Five payout (e.g., to those correctly selecting four winners out of five selected races), then in some cases such portion may not include any Select Five amounts carried over from previous racing days. This would ensure that any carryover Select Five amounts would only be paid to those bettors who correctly select the winning horses in all five of their respectively selected races.

It is possible that on some race days, a number of scheduled races may be cancelled or suspended or may otherwise constitute a "no contest" race such that no winner is determined. In this case, Select Five bets may still exist that may not have missed a selected race previously run. For example, bad weather may force the cancellation of scheduled Races 7, 8, 9 and 10 on a particular day. Certain Select Five bettors may already have correctly selected the winning horses in five previously run selected races (e.g., five races out of Races 1-6). Moreover, other Select Five bettors may have Select Five bets that are "still alive" in that they have not yet missed selecting a winner of any of their five selected races. In these situations, a track may distribute some or all of that day's Select Five payout according to any suitable formula, algorithm or method. As an example, the track may distribute a Select Five payout for a particular day (either including or excluding carryover Select Five amounts from previous race days) to bets that are "still alive" (i.e., bets that have not yet missed a winner of a selected race) according to the following formula (predicated on a ten-race card):

Cancel after Race 1: Entire pool split among bets that are still alive

Cancel after Race 2: 66⅔% to bets with 2 wins, 33⅓% to bets with 1 win

Cancel after Race 3: 50% to bets with 3 wins, 33⅓% to bets with 2 wins, 16⅔% to bets with 1 win Cancel after Race 4: 40% to bets with 4 wins, 30% to bets with 3 wins, 20% to bets with 2 wins, 10% to bets with 1 win Cancel after Race 5: 75% to bets with 5 wins; and the remaining 25% divided as follows:
  40% to bets with 4 wins, 30% to bets with 3 wins, 20% to bets with 2 wins, 10% to bets with 1 win Cancel after Race 6: 75% to bets with 5 wins; and the remaining 25% divided as follows:
  40% to bets with 4 wins, 30% to bets with 3 wins, 20% to bets with 2 wins, 10% to bets with 1 win Cancel after Race 7: 75% to bets with 5 wins; and the remaining 25% divided as follows:
  50% to bets with 4 wins, 33⅓% to bets with 3 wins, 16⅔% to bets with 2 wins Cancel after Race 8: 75% to bets with 5 wins; and the remaining 25% divided as follows:
  66⅔% to bets with 4 wins, 33⅓% to bets with 3 wins Cancel after Race 9: 75% to bets with 5 wins, 25% to bets with 4 wins In the above example, if there are no Select Five bets still alive for a particular category, then that category's amount may be added to another category's amount. For example, if after Race 7 there are no Select Five bets still alive with 3 wins, then the amount for the 3 win category (e.g., 33⅓% of the remaining 25%) may be added to the 4 win category (such that the 4 win category constitutes 83⅓% of the remaining 25% in the example). Any amounts not paid out according to the above formula may carry over to a Select Five payout of a future racing day. It should be understood that the above formula is merely given as an example, and a track may or may not distribute some or all of a Select Five payout in the event of cancelled, suspended or "no contest" races according to any suitable formula, algorithm or method. Moreover, some tracks may choose not to pay any portion of a Select Five payout in the event of any cancelled or "no contest" races and may carryover such payout to a future racing day.

As discussed above, processor 2028 may calculate various current or potential Select Five payout data 2056 using various algorithms or equations. FIG. 13 illustrates examples of such algorithms or equations in accordance with one embodiment. In particular, FIG. 13 illustrates various equations for calculating the current potential payout for a Select Five bet 2012 in a particular day.

In particular, FIG. 13 illustrates equation 20100 which indicates that a particular day's Select Five bets received constitutes the day's Select Five pool. Equation 20102 shows that a day's Select Five take-out is calculated by multiplying a certain commission (e.g., 15%) by the day's Select Five pool. In equation 20104, the Select Five payout is determined by subtracting the day's Select Five take-out from the day's Select Five pool and adding any Select Five carryover from previous race days. As discussed above, some days may include a carryover from one or more previous race days while other days may include no carryover in the Select Five payout.

Figure 14:
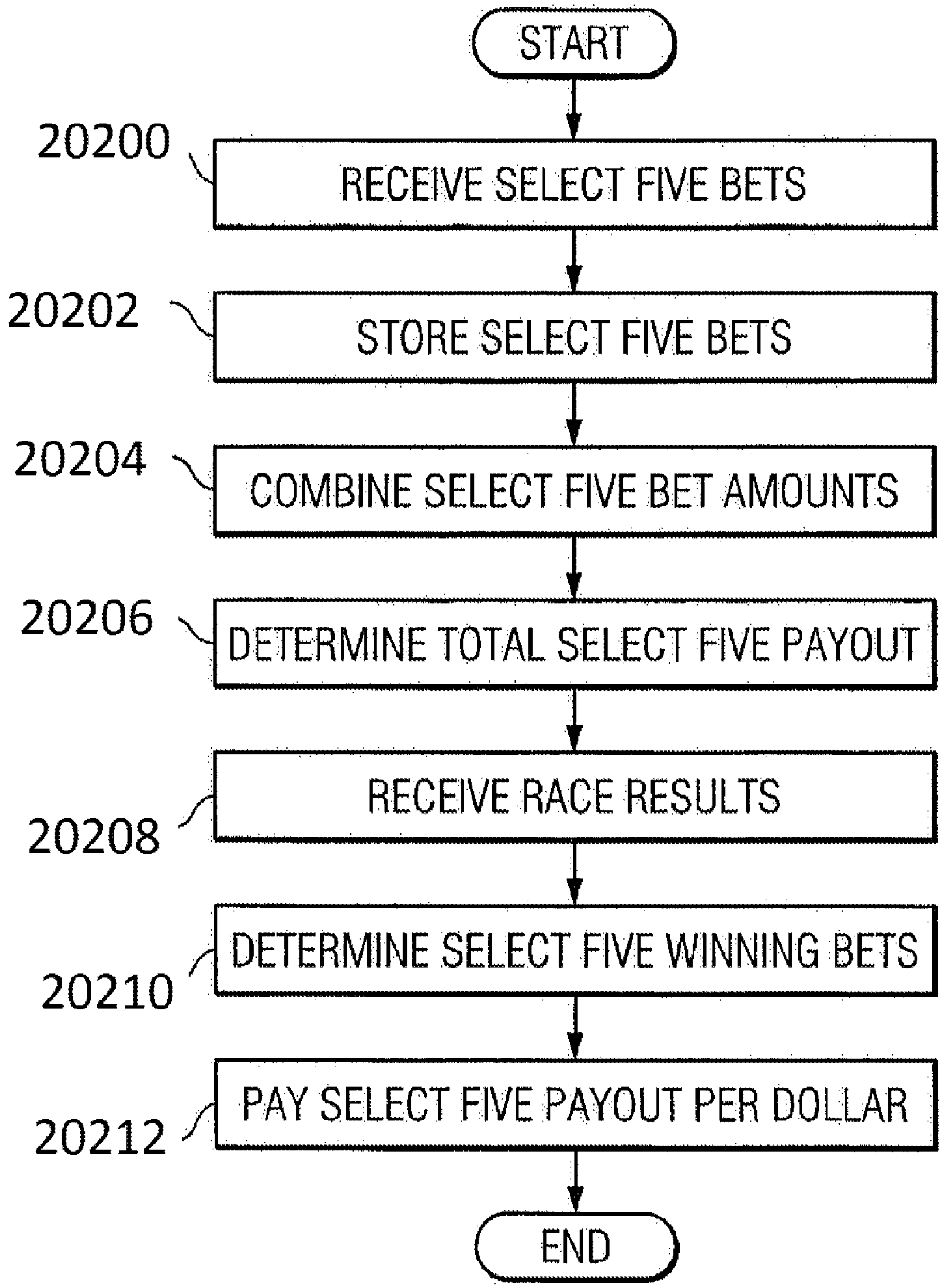
FIG. 14 is a flowchart illustrating an example method of receiving, managing and paying Select Five bets, in accordance with an embodiment of the present invention.

FIG. 14 is a flowchart illustrating an example method of receiving, managing and paying Select Five bets 2012, in accordance with an embodiment. At step 20200, Select Five bets 2012 are received from one or more bettors 2020 via one or more track interfaces 2014, such as described above with reference to FIG. 11. Each Select Five bet 2012 received includes a selection of five horse races selected from a plurality of horse races scheduled to be run at the track in the day, a selection of a respective horse for each of the five horse races selected and a bet amount. Each Select Five bet 2012 may be stored at step 20202, such as within memory 2030, for example.

At step 20204, the Select Five bet amounts may be combined to form the day's Select Five betting pool. At step 20206, a total Select Five payout for the day is determined. Such determination may include deducting a commission from the Select Five betting pool, such as by applying a commission rate to the pool. The determination of the Select Five payout may also include adding a Select Five carryover amount from a previous racing day.

At step 20208 the results of the day's races are received. Such results include an identification of a winning horse for each race run during the day. At step 20210, Select Five winning bets are determined from the Select Five bets 2012 received and stored at steps 20200 and 20202, respectively. In some cases, a Select Five bet 2012 may be considered a winning bet only if the Select Five bet 2012 includes a correct selection of winning horses for each race selected in the bet. In other cases, a Select Five bet 2012 may be entitled to some winning amount if the bet 2012 includes a correct selection of a winning horse for at least one of the races selected in the bet, particularly if no Select Five bets 2012 received include a correct selection of winning horses for each race respectively selected. At step 20212, a Select Five payout per dollar may be paid to bettors 2020 with winning Select Five bets 2012. In some cases, a certain amount of the Select Five payout for the day may carry over to a future racing day if no Select Five bets 2012 received include a correct selection of winning horses for each race respectively selected.

Some of the steps illustrated in FIG. 14 may be combined, modified or deleted where appropriate, and additional steps may also be added to the flowchart. Additionally, steps may be performed in any suitable order without departing from the scope of some embodiments.

As discussed above, various embodiments provide a number of advantages. One advantage is that a bettor may select the five races in a day that the bettor feels he has the best chance to correctly pick the winners. Such selected races may include the most favored horses in the day. If a bettor misses one of his five selected races early in the day, the bettor can re-enter the pool by selecting five additional races that have not yet run. In some cases, bettors may win their five selected races before all the races are complete for the day, thus giving the bettor an incentive to stay at the track longer to collect the bettor's Select Five winnings (since the final payout will not be determined until there are no more Select Five bets with a chance at winning). Staying at the track longer may mean that the bettor places additional bets at the track thus increasing track profit. Bettors may watch the Select Five pool grow throughout the day thus giving a greater incentive to place a Select Five bet in the event of a large Select Five pool.

Group Bet Examples

In some embodiments, participants in an event, such as a race, may be broken into multiple groups, such as two or more groups wherein each group may include, one, two, or more participants. Each group may have the same number of participants, each group may have a different number of participants, and/or some combination thereof. A given participant may be assigned to one or more groups. In one example, each participant is assigned to only one group. In another example, not all participants may be assigned to a group. In a further example, if a participant is the only member of a group, that participant may be considered a stand-alone participant and not actually in a group. In such a case, players/customers/users may not be able to wager on that participant as part of a group type bet as discussed herein. Alternatively, players may still be able to wager on that participant as part of a group type bet as discussed herein. For explanatory purposes, if a participant is the only member of a group, that participant will be referred to as a group and players may be able to wager on that group.

In one example, a wager/betting window may open during which players may wager on one or more groups. Such wagers may be referred to herein as "group bet" wagers. Group bet style of wagering may apply to various types of events including races, such as horse races (e.g., thoroughbred racing, harness racing), dog races, auto races, etc. One skilled in the art will recognize that group bet style of wagering may apply to other types of races and other types of events. For explanatory purposes, races and in particular horse races may be used as an example herein to describe group bet style of wagering. Such examples are intended to be non-limiting. As an example, system 10 of FIG. 2 (or system 2010 of FIG. 11) for example, may be used to provide, manage, offer, and receive group bet wagers as discussed herein, to determine the results of those wagers based on outcomes and/or event results of events, to facilitate and manage the receiving of stakes/wager amounts and the payment of winnings, and where necessary, to facilitate and/or manage the deduction of wager amounts from accounts and/or the addition of winnings to wager accounts. One skilled in the art will recognize that other systems and configurations of systems may be used. One skilled in the art will recognize that one or more aspects of a group bet may be done manually in addition to, and/or as an alternative to computerized systems. One skilled in the art will recognize that multiple group bets may be offered on the same event(s) at the same time.

Various types of group bets may be offered by a track, house, host, OTB, etc and placed by players. For example, a player may place a win group bet/win bet wager, thereby selecting one group. Such a wager may be deemed a winning wager if any participant in the selected group finishes a race first, and/or reaches some designated intermediate point in the race first (For explanatory purposes, a win type group bet may be used as an example herein to describe group bet style of wagering. Such examples are intended to be non-limiting.). As another example, a player may place a place group bet/place bet wager, thereby selecting one group. Such a wager may be deemed a winning wager if any participant in the selected group finishes a race first or second, and/or reaches some designated intermediate point in the race first or second. As another example, a player may place a show group bet/show bet wager, thereby selecting one group. Such a wager may be deemed a winning wager if any participant in the selected group finishes a race first, second or third, and/or reaches some designated intermediate point in the race first, second, or third. As another example, a player may place an exacta group bet/exacta bet wager, thereby selecting two groups in a specified order. Such a wager may be deemed a winning wager if any participant in the first selected group finishes a race first, and/or reaches some designated intermediate point in the race first, and any participant in the second selected group finishes the race second, and/or reaches the designated intermediate point in the race second. One skilled in the art will recognize that these types of bets are examples, and that other types of group bets (including variations of the above) may be formed in similar fashions including, for example, a quinella group bet, a trifecta group bet, a superfecta group bet, a daily double group bet, a pick 3 group bet, etc. For example, in a daily double group bet, participants in a first race may be broken into groups and participants in a second race may be broken into groups. A player may place a daily double group bet wager by selecting a group from the first race and selecting a group from the second race. Such a wager may be deemed a winning wager if any participant in the selected group from the first race finishes the race first, and/or reaches some designated intermediate point in the race first, and if any participant in the selected group from the second race finishes the second race first, and/or reaches some designated intermediate point in the second race first.

Participants may be assigned to groups in various ways and in general, may be determined by the house, track, and/or host association, for example. For example: A) Participants may be assigned to groups at random, such as by a manual process and/or a computerized process. B) The house, track, and/or host association, for example, may assign participants to groups at its discretion, such as based on a conceived order in which the house feels participants may finish the race. C) Participants may be assigned to groups based on posted odds before betting starts for a given race. For example, what the host association perceives to be the odds of each participant winning the race, for example, and/or Morning Line odds, etc. may be used. As an example with respect to Morning Line, the favorite (e.g. the Morning Line favorite) may be assigned to a first group, the middle of the pack may be assigned to a second group, and the long shot may be assigned to a third group. More or fewer groups could be used. As another example here, participants with odds in one range may be assigned to one group, participants in another range may be assigned to a second group, etc. D) As another example, participants may be assigned to groups based on posted odds determined by placed bets at the close of betting before a race starts, such as the standard win odds for a determined participant. Again, based on such odds, participants may be assigned to groups as discussed in “C”. E) As another example, participants may be assigned to groups based on the number assigned to the participant in the race. For example, assuming a nine participant field, the #1 and #2 participants may be assigned to a first group (say Group A), the #3 and #4 participants may be assigned to a Group B, the #5 and #6 participants may be assigned to a Group C, the #7 and #8 participants may be assigned to a Group D, and the #9 participant may be assigned to a Group E. As a similar example, assuming a ten participant field, the #1 and #2 participants may be assigned to a first Group A, the #3 and #4 participants may be assigned to a Group B, the #5 and #6 participants may be assigned to a Group C, the #7 and #8 participants may be assigned to a Group D, and the #9 and #10 participants may be assigned to a Group E. One skilled in the art will recognize that with respect to example “E”, fewer or more groups may be used (e.g., the number of participants assigned to each group may be more than two, and that each group may have a differing number of participants). One skilled in the art will also recognize that other schemes (other than consecutive ordering) may be used to assign participants to groups based on the numbers assigned to the participants. In general, one skilled in the art will also recognize that participants may be assigned to groups in other ways than described herein.

The identity of the participants of each group may be displayed and/or made known to players. For example, such information may be printed on paper wagering cards, displayed on over-head monitors at a track and/or off site betting sites, displayed to players via computing devices such as phones, PDAs, tablets, laptops, desktops, displayed to players on ADW (advanced deposit wagering) platforms, displayed to players via a player’s TV, etc. In some instances, the participants of each group may be made known to players prior to and/or at the opening of a betting window in which group bets are accepted (e.g., if the members are known). Here, players may know the members of the group on which they are wagering. In some instances, the participants of a group may be made known to players at and/or after the close of a betting window in which group bets are accepted (e.g., because the participants are not known/determined until after the close of betting, such as if participants are decided based on posted odds determined by placed standard win bets at the close of betting). Here, players may not know the members of the group on which they are wagering. In some instances, participants of a group may be constantly displayed to players as the betting window is open but change and not be final until after the close of betting. For example, if participants are decided based on posted odds determined by placed standard win bets at the close of betting, the posted odds at any given time while betting is open may be used to show participants in a group, with the posted odds determined by placed bets at the close of betting being used to determine the final makeup of the group.

A group bet may be run as a pooled wager and/or a fixed odds wager and placed against a house/host/track, for example, which sets the odds, for example. As one example, the odds for each group may be fixed during the duration in which a wagering window is open such that all players receive the same odds for a bet on a given group, regardless of when the wager is placed. As another example, the odds for each group may fluctuate during the duration in which the wagering window is open such that the odds a player receives for a bet on a given group is dependent upon the odds at when the wager is placed. In both instances, odds and/or payoffs may be displayed (and in the case of changing odds, constantly updated) to players using similar mechanisms as discussed above for displaying group participants. The payout for a winning group bet wager may be the same regardless of which participant of the group wins the race, for example. In the event of a dead heat to win, for example, involving two or more participants of the same group, the group bet payout may be as if there was one winner of the race and such winner was a member of such group. In the event of a dead heat to win, for example, involving two or more participants that are members of two or more groups, there may be a payout to players who bet on each group at the respective odds for that group. Alternatively, the players who bet on such groups may have their stakes returned, while players who bet on a losing group may not have their stakes returned. As another alternative, all players may have their stakes retuned. As a further alternative, no payouts may be made and no stakes returned. One skilled in the art will recognize these are only examples and other payouts are possible in the event of a dead heat.

A group bet may also be offered as an odds based wager in which a house/host/track, for example, defines the groups, for example, but in which players set the odds and wager against one another. In other words, the wager may be offered as an exchanged based wager, for example. For example, one player may bet a first group will beat a second group at odds defined by the person. Another person may accept the opposite side of that wager at the odds. In some instances, the person accepting the wager may be the house/host/track, etc. One skilled in the art will recognize that a fixed odds based group bets may be offered in other ways than discussed herein.

Alternatively, a group bet may be run as a pari-mutual wager that is offered by a house or totalizer, etc., for example. Using a win type group bet as an example, a pari-mutual group bet may be run as a standalone win pool, separate from the win pool for a standard win bet for an event. Alternatively, again using a win type group bet as an example, such a bet may be run together with the win pool for a standard win bet for an event. As an example, assuming a nine participant field, each defined group of two or more participants may simply be considered an additional participant. For example, assuming two groups are formed, the field would now consist of eleven participants or alternatively, as eleven groups with many of the groups being made up of just one participant. In both instances, odds, probable payoffs, and/or actual payoffs may be displayed (and constantly updated as appropriate as additional wagers are placed) to players using similar mechanisms as discussed above for displaying group participants, and may be displayed in a similar manner as the odds, probable payoffs, and/or actual payoffs for a standard win bet, for example. The payout for a winning group bet wager may be the same regardless of which participant of the group wins the race, for example.

Continuing with pari-mutual wagering, one way for computing a payoff, for example, may include first deducting from the net pool the amount wagered (the stake amount) by players who wagered on the group that has the winning participant (again, using a win bet as an example), the remaining balance being the profit. The profit may then be divided by the amount wagered on the winning group, such quotient being the profit per dollar wagered on the winning group. One skilled in the art will recognize that other ways of computing a payoff are possible, including accounting for takeout, commissions, etc.

Continuing with pari-mutual wagering, the net pool may be distributed, for example, as a single price pool to those player(s) that selected the group that includes the winning participant (again, using a win bet as the example). In the event there are no wagers on the group that includes the winning participant, the pool may be distributed to those players who wagered on the group that includes the participant that finished second in the event. In the event there are no wagers on the group that includes the participant that finished second in the event, the pool may be distributed to those players who wagered on the group that includes the participant that finished third in the event, etc. As an alternative, if no players wagered on the winning group, all group bet wagerers may have their stakes retuned. As a further alternative, no payouts may be made and no stakes returned. One skilled in the art will recognize these are only examples and other payouts are possible in the event that no wagers are made on a winning group for example.

Continuing with pari-mutual wagering, in the event of a dead heat to win, for example, involving two or more participants of the same group, the group bet payout may be as if there was one winner of the race and such winner was a member of such group. In the event of a dead heat to win, for example, involving two or more participants that are members of two or more groups, the payout may be determined by dividing the net pool. Alternatively, all players may have their stakes retuned. As a further alternative, no payouts may be made and no stakes returned. One skilled in the art will recognize these are only examples and other payouts are possible in the event of a dead heat. One skilled in the art will recognize that a pari-mutual based group bets may be offered in other ways than discussed herein.

A group bet may be run as a pre-event wager and/or as an in-run or in running, or in-game or in-event wager. As a pre-event wager, a betting window may be opened and closed prior to the start of a race, for example, allowing group bets to be placed during the betting window. The results of such a wager may be based on, for example, the order of participants at the finish line of a race and/or the order of participants at an intermediate point in the race, such as the order of participants at a designated furlong in a horse race event, or at a designated mile or lap in an auto race, etc. As an example of the various combinations described herein, at some designated time prior to the start of a race (e.g., a horse race), all participants may be divided into two groups (e.g., Group A and Group B) using the various techniques described herein, such as based on Morning Line, conceived house/host/track odds, the conceived order in which a house/host/track thinks the participants may finish the race, etc. As an example, the favorite (or multiple favorites) may be placed in one group (e.g., Group A) with all other participants being placed into the other group (e.g., Group B). The members of each group once selected may not change, enabling players to know the members of the group they are wagering on. As an example, a win type group bet may be offered to players, allowing players to wager on which group will have the winning participant. The wager may be offered as a standalone pari-mutual pool, as a pari-mutual pool that is combined with the win pool for a standard win bet, or as a fixed-odds wager offered by a house, for example, which odds may or may not change. As another example of the various combinations described herein, at some designated time prior to the start of a race (e.g., a horse race), all participants may be divided into three groups (e.g., Group A, Group B, and Group C) using the various techniques described herein, such as based on Morning Line, the conceived order in which a house/host/track thinks the participants may finish the race, etc. As an example, the Morning Line favorite or determined favorite (or multiple favorites) may be placed in one group (e.g., Group A), the Morning Line middle of the pack or determined middle of the pack may be placed in another group (e.g., Group B), and the Morning line long shot or determined long shot may be placed in the last group (e.g., Group C). The members of each group once selected may not change, enabling players to know the members of the group they are wagering on. As an example, a win type group bet may be offered to players, allowing players to wager on which group will have the winning participant. The wager may be offered as a standalone pari-mutual pool, as a pari-mutual pool that is combined with the win pool for a standard win bet, or as a fixed-odd wager offered by a house, for example, which odds may or may not change. One skilled in the art will recognize that these are merely examples and other types of wagers may be offered.

When group bet is run as an in-run/in-event wager, a betting window may be opened prior to the start of the race or during the race, and closed at some point in the race and/or some set time into the race, allowing group bets to be placed during the betting window and thereby during the race. As an example, the betting window may be opened at the start of the race, at a set time into the race, when the race reaches some distance into the race (such as when the lead participant reaches a designated point in the race, and/or when some participant other than the lead participant reaches a designated point in the race), etc. The betting window may be opened manually or electronically via computerized monitoring systems for example that may be part of a wagering system (such as those of FIGS. 2 and/or 11 for example). For example, if the window is opened at some set time (time duration) into the race, at the start of the race a clock may be started either manually or electronically (such as by the opening of the gate). When the set time (time duration) is reached, which may be monitored electronically or manually, the betting window may be opened (electronically or manually). If distance is used to open the betting window, a person may watch the race participants and manually open the window when the lead participant, for example, reaches the designated point in the race. As another example, an electronic eye may be placed at the designated point in the race and when the lead participant crosses the eye, the window may be electronically opened. As another example, each participant may be equipped with an RFID chip. An electronic system, upon detecting the RFID of a lead participant at the designated point in the race, may open the window. As a further example, systems such as those offered by Trakus may be used to monitor the location of participants and used to open the window when the lead participant reaches a designated point. One skilled in the art will recognize that these are merely examples of how to open a betting window and other techniques (manual and electronic) may be used.

With respect to closing the betting window, the window may be closed manually or electronically via computerized monitoring systems for example that may be part of the wagering system (such as those of FIGS. 2 and/or 11 for example). For example, a betting window may be closed at some set time after it is opened. Here, a clock may be started either manually or electronically when the betting window is opened and closed manually or electronically at some set time thereafter. As another example, time (time duration) into a race may be used to close the window. Here, at the start of the race a clock may be started either manually or electronically. When the set time/time duration into the race is reached, which may be monitored electronically or manually, the betting window may be closed (electronically or manually). As one example, the time duration may be set such that the race covers (by estimation) a certain distance when the window is closed. For example, the time duration may be set such that the race covers all but the last furlong (by estimation), for example, when the window is closed. As an example, the time duration may therefore be based on the length of the race and the track surface (grass, dirt, cement, tar, etc) and/or conditions (wet, dry, etc.). As one example for horse racing, the length of a race (i.e., total time of a race) has been estimated to be twelve (12) seconds×the number of furlongs. Hence, if it is desired to close the betting window at time when the race covers approximately all but the last furlong (i.e., close the window at about the time when the lead participant is at the last furlong), the time duration may be set at (length of race in furlongs−1)×12 seconds. Similar methods may be used to open a betting window such that the race covers a certain distance before the window is opened. If distance is used to close the betting window, a person may watch the race participants and manually close the window when the lead participant reaches the designated point in the race and/or when some participant other than the lead participant reaches some point in the race, for example. As another example, an electronic eye may be placed at the designated point in the race and when the lead participant, for example, crosses the eye, the window may be electronically closed. As another example, each participant may be equipped with an RFID chip. An electronic system, upon detecting the RFID of a lead participant, for example, at the designated point in the race, may close the window. As a further example, systems such as those offered by Trakus may be used to monitor the location of participants and used to close the window when the lead participant, for example, reaches a designated point. One skilled in the art will recognize that these are merely examples of how to close a betting window and other techniques (manual and electronic) may be used.

The results of an in-run group bet wager may be based, for example, on the order of participants at the finish line of a race and/or the order of participants at an intermediate point in the race, such as the order of participants at a designated furlong in a horse race event, or at a designated mile or lap in an auto race, etc. As example of the various combinations described herein, all participants may be divided into two or more groups (e.g., Group A, Group B, and Group C) using the various techniques described herein, such as based on Morning Line, conceived house/host/track odds, the conceived order in which the house/host/track thinks the participants may finish the race, the posted odds determined by placed bets at the close of pre-race betting, such as the win odds for a determined participant, etc. As an example, the favorite (or multiple favorites) (as determined, for example, using any technique described herein) may be placed in one group (e.g., Group A), and the rest of the field may be placed in another group (e.g., Group B) (an another alternative, the favorite may be placed in one group, the middle of the pack in a second group, and the long shot in a third group) (as another alternative, the favorite may be placed in a group, the next favorite in another, etc, and then the rest of the field in a last group) (as another alternative, each participant in the race may be placed in its own group). The members of each group once selected may not change, enabling players to know the members of the group they are wagering on. As an example, a win type group bet may be offered to players, allowing players to wager on which group will have the winning participant. The wager may be offered as a standalone pari-mutual pool, or as a fixed-odd wager offered by a house, for example. As an example of a fixed-odds wager, the odds may be static during the duration of the betting window/during the duration of the race. As another example, the odds on one or more groups may change over the duration of the betting window or in other words, over the duration of the race. Here, the odds a player receives may be based on the odds at the time the player places the wager. Changing/updating odds for each group may be done manually, such as at periodic times in the race, at periodic points (such as at each furlong, lap, mile, etc) in the race, and/or at a non-periodic rate and/or points. For example, as the lead participant passes each furlong, the odds may be updated for one or more groups based on the relative or specific positions of one or more participants in one or more groups. Alternatively, changing/updating odds for each group may be done electronically, such as at periodic times and/or points in the race and/or at a non-periodic rate and/or points. For example, one or more participants may be equipped with an RFID chip. The relative positions (or specific positions) of participants in the race may be monitored at all times and/or at periodic points in the race. For example, as the lead participant passes each furlong, the odds may be updated for one or more groups based on the relative or specific positions of one or more participants in one or more groups.

As another example, systems such as those offered by Trakus may be used to monitor the location of participants, which locations may be used to update one or more group odds at fixed times (or non-fixed times) and/or as participant(s) reach certain locations, for example. One skilled in the art will recognize that these are merely examples of how to update odds and other techniques (manual and electronic) may be used. As another example of the various combinations described herein regarding an in-run group bet, participants may be assigned to groups based on the number assigned to the participant in the race. For example, assuming a nine participant field, the #1 and #2 participants may be assigned to a first group (say Group A), the #3 and #4 participants may be assigned to a Group B, the #5 and #6 participants may be assigned to a Group C, the #7 and #8 participants may be assigned to a Group D, and #9 participant may be assigned to a Group E. As an example, a win type group bet may be offered to players, allowing players to wager on which group will have the winning participant. The wager may be offered as a standalone pari-mutual pool, or as a fixed-odd wager, which odds may or may not change. One skilled in the art will recognize that these are merely examples and other types of bets may be offered.

As another example, coding schemes may be used to assist players in easily recognizing the position of a given group or groups in an event. For example, using a group bet wager in which participants have been divided into three groups each with one or more participants, each group may be assigned a color, such as red, black, or green (although other colors could be used). Players may have made known to them the colors assigned to each group. As participants race and such race is displayed to players, one or more participants may have its respective group color superimposed over it. As another example, colored geometric shapes (such as squares, circles, rectangles, etc) may be displayed at some position in a display. There may be one geometric shape for each participant in the race, for example, with each shape colored the respective group color to which the participant is a member. The same shape may be used for all participants or each group may be assigned its own shape. The colored shapes may be displayed in a sequential order which matches the order of the participants in the race (e.g., red, red, green, black, red, . . . , green). Hence, as participants change respective positions in the race, the sequential order of the colored shapes may change. In addition, assuming groups are assigned names (for example, letters such as "A", "B", "C", and/or numbers, such as the one or more numbers assigned to the participants in the group), such names may also be displayed in each colored geometric shape. As another example, the color (and possibly shapes) may be removed and the names just displayed ("B" "B" A" "C" . . . "C"). The sequence of geometric shapes may be shown alone on a display and/or together with a display of the race, which may also include colors superimposed on the participants as described above. As another example, rather than there being be one geometric shapes for each participant in the race, there may be one geometric shape for each group in the event, for example, with each shape colored the respective group color of the group. Each group may have the same or different shapes. Within each shape, for example, may be displayed the relative position in the race of the lead participant in that group. Hence, if a group has three participants in $2^{nd}$, $5^{th}$ and $8^{th}$ place, that group's shape may display just second place. The sequence of the three shapes may change to reflect the respective positions of each group as based on each group's lead participant. Again, group names may also be displayed in each shape, for example. As another example, the color and possibly shapes may be removed and the names and positions just shown. One skilled in the art will recognize other ways may be used to display the relative positions of participants.

As another example, the coding schemes or other designations discussed herein may be used to assist players in placing bets. For example, using a group bet wager in which participants have been divided into three groups each with one or more participants, with each group being assigned a color such as red, black, or green (although other colors may be used), a player may place a bet by simply betting on red, black, or green. As a similar example, assuming the groups are assigned names such as letters, like "A", "B", "C (although other names may be used), a player may place a bet by simply betting on "A", "B", or "C".

As another example, assuming each group is assigned a color and/or name and that a colored shape and/or group name is displayed for each participant in a race as discussed above, a wager may also be offered (e.g., by a house, host, track) in which players wager on the colors and/or names themselves. Using color as an example and assuming there are three groups with three colors red, black, and green, players may wager on the sequence of the colors at the end of the race (or at some defined point in the race). Similarly, players may wager on what the colors will be over the top, middle, or bottom x (e.g., 3 or 5) finishing positions, for example, in a race. For example, the player may wager that the top three finishing positions will be all red, that there will be no black, that there will be more green than black, that there will be one of each color, etc. Such wagers may be offered cumulatively over a given race. For example, the group colors of the three leaders at each furlong may be recorded and a player may wager on these cumulative results such as, there will be more green than black, that there will be more red than black by at least a given spread, that a given sequence (e.g., red, red, black, black, green) will appear at least once in the cumulative results. Similar wagers may be offered over two or more races (including races in the same day and/or different days, and/or races at the same track and/or different tracks, and/or races of the same type (e.g., all horse races or all auto races) and/or races of different types (e.g., horse races and auto races) with results gathered at the finish line and/or one or more intermediate points in the races. One skilled in the art will recognize that these are only examples and that other similar types of wagers may be offered over one or more races.

As an example, offering a group bet wager may include opening for an event a wagering window. The window may be opened before or during the event. The window may be closed before or during the event. The wagering window may be such that only group bets wagers are offered and received during this window. Alternatively, other types of wagers, such as traditional racing event wagers, may also be offered and received during the wagering window. Offering a group bet wager may further include assigning participants of the event to one or more groups. Participants not actually assigned to a group may, by default for example, be considered members of the same group and/or each a sole member of its own group. Hence, participants do not need to be assigned to a group to be considered part of a group and/or to be a group on which a group bet wager may be made. Participants may be assigned to groups before, during, and/or after the wagering window is opened. Offering a group bet wager may further include offering to players a defined set of wagers including for example, a win group bet wager. A group bet wager may be offered as a pari-mutual wager and/or a fixed odds wager. Offering a group bet wager may further include receiving, from one or more players, one or more wagers on one or more groups. Such wagers may include any or more of: a player ID, a wager amount/stake amount, a designation of one or more events, a designation of one or more groups and/or participants, desired odds, account ID, etc. Again, such wagers may include a wager that at least one respective participant of that group will reach a designated point in the race first. That point may be an intermediate point and/or the finish line. Offering a group bet wager may further include verifying a wager with a player, notifying a player of group members, and notifying a player of odds, payoffs, and payouts. Offering a group bet wager may further include closing the wager window, after which no further wagers are accepted. Offering a group bet wager may further include receiving event results, such as the finishing position of participants at the designated point. Offering a group bet wager may further include determining which of the one or more groups is a winning group, for example, based on finishing positions of the participants at the designated point in the race. Offering a group bet wager may further include facilitating a payment to players and/or player accounts for the wagers made on the group determined be the winning group. Offering a group bet wager may further include facilitating a deduction of a wager amount or stake from accounts for wagers made on the losing group(s).

One skilled in the art will recognize that these are example operations and that further or fewer operations may be performed. One skilled in the art will further recognize that one or more of these operations may be performed manually and/or by a computing device.

Figure 15:
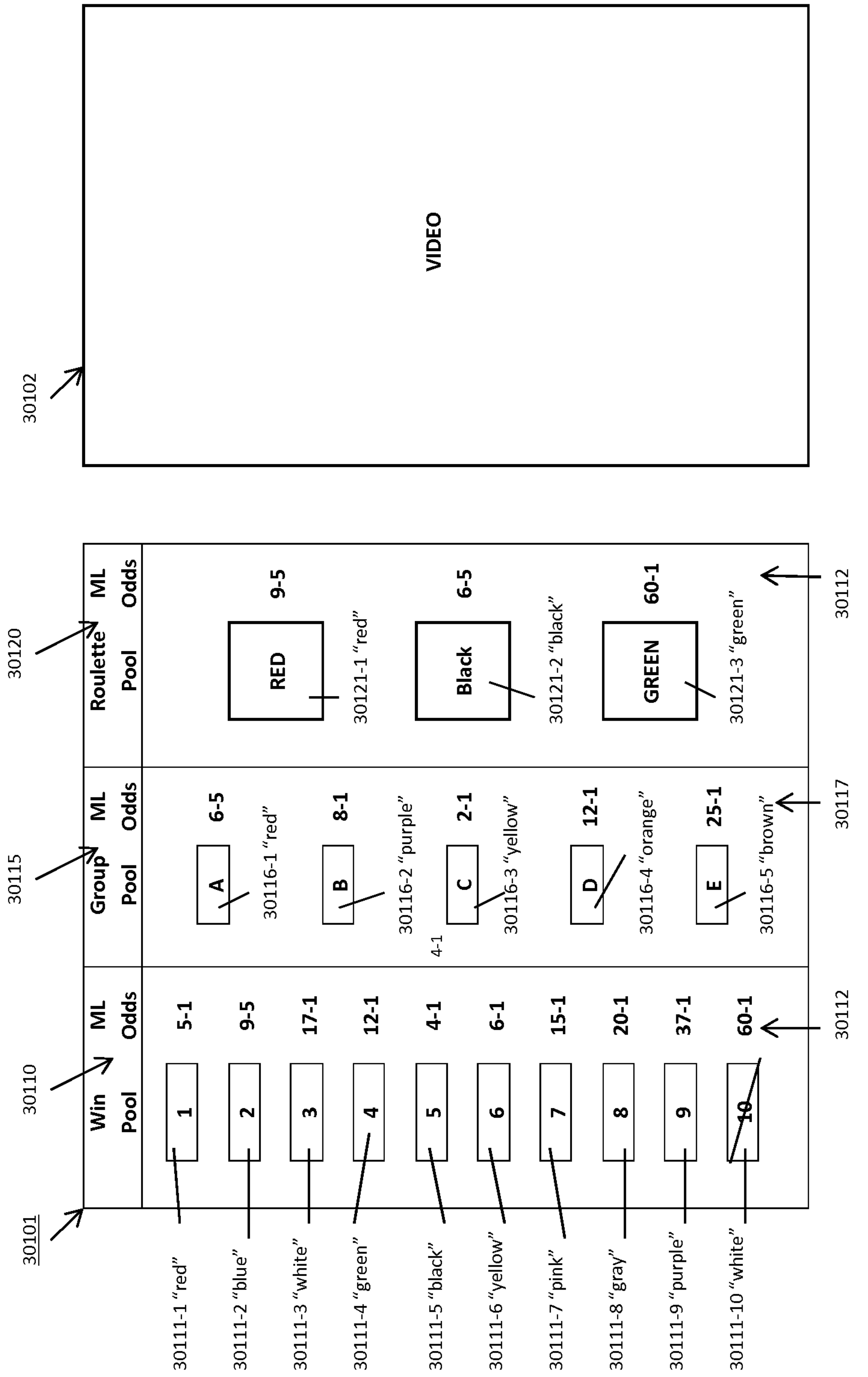
FIG. 15 illustrates an example interface for presenting to a player a plurality of wagering options, including Group Bet wagering options.

Referring to FIG. 15 there is shown an example interface 30101 that may be displayed to a player and in particular, may display to a player a plurality of wagering options (such as option 30110, 30115, and 30120) and may also assist a player in selecting one or more wagering options in order to place a bet/wager on an event. FIG. 15 refers to a ten participant event, such as a horse race, although one skilled in the art will recognize that the interface may refer to an event with a different number of participants and/or to different types of events. Interface 30101 may be displayed to a player via a computing device such as a phone, PDA, tablet, laptop, desktop, kiosk, etc. Interface 30101 may also be displayed to a player via player's TV set. As another example, interface 30101 may be displayed to a player via a gaming machine, such as a slot machine. One skilled in the art will recognize that other means may be used to display interface 30101 to a player.

In addition to interface 30101 being displayed to a player, a video of the event being wagered on may also be displayed to a player via an interface 30101. The video may be a live video feed and/or delayed video feed and/or a video replay of the event. According to various example, both interface 30101 and 30102 may be displayed to a player on the same device (at the same time, e.g.) or via different devices. For example, a player may view both interfaces on a given phone, PDA, tablet, laptop, desktop, kiosk, TV (such as picture-in-picture), etc. As another example, interface 30101 may be displayed to a player on a given phone, PDA, tablet, laptop, desktop, kiosk, etc. and interface 30102 may be displayed to a player via another display device, such as a TV. One skilled in the art will recognize that other display options are possible.

Example interface 30101 of FIG. 15 shows three example wager options, 30110, 30115, and 30120, although one skilled in the art will recognize that the interface may include more and/or a few number of wagers. One skilled in the art will also recognize that other additional types of wagers may be offered on an event and not shown on example interface 30101 and/or may available to a player via another interface.

Each of wager options 30110, 30115, and 30120 may be any of a pre-event wager and/or an in-run type wager. Similarly, each of wager options 30110, 30115, and 30120 may be offered as any of a pari-mutual wager and/or an odds based wager. Additional, each of wager options 30110, 30115, and 30120 may be a win bet, although any of the options may be of a different type of bet (e.g., show bet). Furthermore, the result of each of wager options 30110, 30115, and 30120 may be determined, for example, at the finish line of a race event and/or at one or more intermediate points in the race event. For description purposes only, each of wagers 30110, 30115, and 30120 will be described herein as a pari-mutual win type wager where the wager is offered as a pre-event wager and where wager results are determined based on the order of participants at the finish line of a race event.

Referring to wager option 30110, this wager may be a standard pari-mutual win bet (different win pool than that of options 30115 and 30120) where a player may wager on any of which of the ten participants 30111-1 through 30111-10 will win the race. Here, each participant in the event may be represented in interface 30101 by a shape (such as a geometric shape, a shape of a horse, a dog, a car, etc) 30111-1 through 30111-10 that may be a filled-in color and which may have superimposed thereon the number assigned to the respective participant in the race event. Each participant may be represented by a different color and/or different shape; alternatively, colors may be re-used and the same shape used for all participants and/or combinations thereof. One skilled in the art will recognize that the colors and shapes shown in FIG. 15 are merely examples and that other colors and shapes may be used. As further shown in FIG. 15, each participant may have associated therewith odds, such as Morning Line odds, 30112 representing a perceived/determined chance of the participant winning the race event. In this example, a player may select a participant to wager on, for example, by clicking on or touching (e.g., via a touch screen) any one of the colored geometric shapes 30111-1 through 30111-10. As another example, a player may enter into a wager selection area of interface 30101 (such an area is not shown in FIG. 15) any of a participant's event number or the participant's assigned color. One skilled in the art will recognize that other types of interfaces may be used to select a winning participant including, for example, an interface that has player selectable keys/buttons numbered 1-10 for each participant and/or selectable keys/buttons having colors matching the participants' assigned colors, etc.

Referring to wager option 30115, this wager may be a pari-mutual win group bet wager (different win pool than that of options 30110 and 30120). In this example, each of the ten participants may be assigned, for example, to one of five groups 30116-1 through 301161-5. For example, the participants may be divided into groups of two participants each, with each participant assigned to only one group. One skilled in the art will recognize that other group makeups may be used. In the example of FIG. 15, the #1 and #2 participants may be assigned to a first group 30116-1 (Group A", the #3 and #4 participants may be assigned to another group 30116-2 (Group B), the #5 and #6 participants may be assigned to another group 30116-3 (Group C), the #7 and #8 participants may be assigned to another group 30116-4 (Group D), and the #9 and #10 participants may be assigned to a further group 30116-5 (Group E). As discussed herein, a player may wager on a selected group, which wager may be deemed a winning wager if any participant in the selected group finishes the race first. Here, each group in the event may be represented in interface 30101 by a shape (such as a geometric shape, a shape of a horse, a dog, a car, etc) 30116-1 through 30116-5 that may be a filled-in color. Each group may be represented by a different color and/or different shape; alternatively, colors may be re-used and the same shape used for all groups and/or combinations thereof. One skilled in the art will recognize that the colors and shapes shown in FIG. 15 are merely examples and that other colors and shapes may be used. As an additional and/or further example, each group may be represented by a name, here A, B, C, D, and E (although other names may be used), which names may be superimposed on respective shapes. As further shown in FIG. 15, each group may have associated therewith odds 30117 representing a perceived/determined chance of that group (or participant in that group) winning the race event. Odds 30117 may be a combination of and/or determined from odds 30112 corresponding to the participants in each group. In this example, a player may select a group to wager on, for example, by clicking on or touching (e.g., via a touch screen) any one of the colored geometric shapes 30116-1 through 30116-5. As another example, a player may enter into a wager selection area of interface 30101 (such area is not shown in FIG. 15) any of a group's assigned name and/or color. One skilled in the art will recognize that other types of interfaces may be used to select a winning group including, for example, an interface that has player selectable keys/buttons labeled A-E for each group and/or selectable keys/buttons having colors matching the groups' assigned colors.

Referring to wager 30120 option, this wager may also be a pari-mutual win group bet wager (different win pool than that of options 30110 and 30115). In this example, each of the ten participants may be assigned, for example, to one of three groups 30121-1, 30121-2, or 30121-3. One skilled in the art will recognize that other group makeups may be used. In this example, odds 30112 may be used to assign participants to groups. For example, the determined favorite (here participant #2) may be assigned to one group (here, 30121-1), the determined long shot (here participant #10) may be assigned to another group (here, 30121-3), and all other participants/middle of the pack (here participants #1 and #3 through #9) may be assigned to a third group (here, 30121-3) As discussed herein, a player may wager on a selected group, which wager may be deemed a winning wager if any participant in the selected group finishes the race first. Similar to the other wager options, each group in the event may be represented in interface 30101 by a shape (such as a geometric shape, a shape of a horse, a dog, a car, etc) 30121-1 through 30121-3 that may be a filled-in color. Each group may be represented by a different color (such as red, black, or green) and/or different shape; alternatively, the same shape used for all groups and/or combinations thereof. One skilled in the art will recognize that the colors and shapes shown in FIG. 15 are merely examples and that other colors and shapes may be used. As an additional and/or further example, each group may be represented by a name, here the words "RED", "BLACK", and "GREEN" (although other names may be used), which names may be superimposed on respective shapes. As further shown in FIG. 15, each group may have associated therewith odds 30122 representing a perceived/determined chance of that group (or participant in that group) winning the race event. Odds 30122 may be a combination of and/or determined from odds 30112 corresponding to the respective participants in each group. In this example, a player may select a group to wager on, for example, by clicking on or touching (e.g., via a touch screen) any one of the colored geometric shapes 30121-1 through 30121-3. As another example, a player may enter into a wager selection area of interface 30101 (such area is not shown in FIG. 15) any of a group's assigned name and/or color. One skilled in the art will recognize that other types of interfaces may be used to select a winning group including, for example, an interface that has player selectable keys/buttons labeled RED, BLACK, GREEN for each group and/or selectable keys/buttons having colors matching the groups' assigned colors.

One skilled in the art will art will recognize that interface 30101 is merely an example and that other and/or additional wagering options may be presented to a players and that such wagering options may be presented to a player in other and/or additional ways.

Various examples of a group wager may be combined in any manner with other example wagering embodiments. For example, a pick/select n style group wager may be available in some embodiments. In such an example, a player may select n races and select groups within each race. As another example, group wager may be combined with a daily double that has both a in run pool and a pre game pool.

In some embodiments, an aggregate of wager outcomes over time may be used to resolve a wager. For example, a group wager using the red/green/black designations over a series of races may be resolved based on whether there are more reds, blacks, or greens over the number of races, whether a pattern of reds, blacks, and greens wagered on by a user occurs, whether all the races result in black, and/or in any other manner that combines the outcomes of the races together to form a outcomes base don group designations. In some embodiments, such aggregate outcomes may be combined with any other embodiments described herein. For example, a pick/select n wager may allow a user to select races over which such an aggregate applies and/or place such a wager during or before a first selected race begins.

Further Device Examples

It should be recognized that any set of computing devices may be used to facilitate functionality such as that described herein. For example, a server may maintain data related to available wagers and take appropriate actions to facilitate wagers. A server may transmit available wager information, determine wagering windows, determine available wagers, determine odds, receive wagers, maintain accounts, receive race results, determine outcomes, credit accounts, determine groups, assign designations to groups, determine pools into which wagers are placed, maintain pools, and so on. A computing device may use outside services and/or information sources to identify any information and/or provide any functionality that may be needed to provide the desired functionality. Functionality may be broken up among computing device and/or performed by a single device. For example, in some embodiments, various modules and/or cloud services may provide some functionality for other devices.

In some embodiments, a user device (e.g., a mobile device, computer, etc.) may transmit and receive information from a server or other computing device. The interaction between an operator and a user may allow users to engage in the novel forms of entertainment described herein.

Although various embodiments have been described, it should be understood that various other changes, substitutions and alterations may be made hereto without departing from the spirit and scope of other embodiments. It is intended that various embodiments may encompass all changes, substitutions, variations, alterations and modifications ascertained by those skilled in the art.

Processes and/or Apparatus

Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetoothä, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function. Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. Incorporation by Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

What is claimed is:

1. An apparatus comprising:

a computing device; and a non-transitory medium having stored thereon a plurality of instructions that when executed by the computing device cause the apparatus to:

assign participants of a race to respective groups of a set of three groups, wherein each of the participants has respective odds associated therewith of winning the race, wherein based on the odds a first one of the participants is deemed a favorite, a second one of the participants is deemed a long shot, and the remaining participants are deemed a middle of the pack, and wherein the favorite is assigned to a first group of the set of three groups, the long shot is assigned to a second group of the set of three groups, the middle of pack are assigned to a third group of the set of three groups, and there are at least two members of the middle of the pack;

receive a wager on the first one of the set of three groups, in which the wager wins if the favorite reaches a designated point in the race first;

receive another wager on the third one of the set of three groups, in which the another wager wins if any one of the middle of the pack reaches the designated point in the race first;

determine which one group of the set of three groups is a winning group based on at least one finishing position of at least one of the participants at the designated point in the race; and facilitate payments for wagers made on the winning group in response to determining that the winning group is the winning group.

2. The apparatus of claim 1, in which the instructions, when executed, cause the apparatus to: allocate the wager on the first one of the set of three groups and the another wager on the third one of the set of three groups to a single pari-mutual pool.

3. The apparatus of claim 1, wherein the first group is assigned a first color, the second group is assigned a second color, and the third group is assigned a third color.

4. The apparatus of claim 3, wherein players wager on one or more of the set of three groups by selecting one of the first, second, or third colors.

5. The apparatus of claim 3, wherein the first color is red, the second color is green, and the third color is black.

6. The apparatus of claim 3, wherein the instructions, when executed, cause the apparatus to: receive a third wager that a sequence of the first, second, and third colors will be in a particular order at the designated point in the first race, and wherein the sequence of the first, second, and third colors is determined based on assigned group colors of the participants and the finishing positions of the participants at the designated point in the race.

7. The apparatus of claim 1, wherein the instructions, when executed, cause the apparatus to:

assign each of the participants of the race to one of a plurality groups separate from the set of three groups, wherein each of the participants is assigned a respective one of a consecutive sequence of numbers, the numbers beginning with one, and wherein participants of the race that are numbered 1 and 2 are assigned to a first of the plurality of groups, participants of the race that are numbered 3 and 4 are assigned to a second of the plurality of groups, and participants of the race that are numbered 5 and 6 are assigned to a third of the plurality of groups;

receive a third wager on one of the plurality of groups, in which the third wager wins if at least one participant in the one of the plurality of groups reaches a designated point in the race first;

receive a fourth wager on another of the plurality of groups, in which the fourth wager wins if at least one participant in the another of the plurality groups reaches the designated point in the race first.

8. The apparatus of claim 7, in which the instructions, when executed, cause the apparatus to:

allocate the wager on the first one of the set of three groups and the another wager on the third one of the set of three groups to a first pari-mutual pool; and allocate the third wager on the one of the plurality of groups and the fourth wager on the of the plurality of groups to a second pari-mutual pool that is different from the first pari-mutual pool.

9. The apparatus of claim 1, in which the instructions, when executed, cause the apparatus to:

determine that the wager on the first one of the set of three groups should be allocated to a first pool based on receiving the wager on the first one of the set of three groups before a start of the race and determining that the wager on third one of the set of three groups should be allocated to second pool based on receiving the wager on the third one of the set of three groups after the start of the race.

10. An apparatus comprising:

a computing device; and a non-transitory medium having stored thereon a plurality of instructions that when executed by the computing device cause the apparatus to:

open for a race a wagering window wherein the wagering window closes at some time during the race;

assign each participant of a plurality of participants of a race to one of two or more groups;

receive after a start of the race at least one wager on one of the two or more groups, in which the at least one wager wins if at least one respective participant of the one of the two or more groups reaches a designated point in the race first;

receive after the start of the race at least one other wager on another of the two or more groups, in which the at least one other wager wins if at least one respective participant of the other of the two or more groups reaches the designated point in the race first;

determine which of the two or more groups is a winning group based on at least one finishing position of at least one of the participants at the designated point in the race; and facilitate payments for wagers made on the winning group in response to determining that the winning group is the winning group;

wherein each participant of the plurality of participants has respective odds associated therewith of winning the race, wherein based on the odds a first one of the participants is deemed a favorite, a second one of the participants is deemed a long shot, and the remaining participants are deemed a middle of the pack, and wherein the favorite is assigned to a first group of the two or more groups, the long shot is assigned to a second group of the two or more groups, the middle of pack are assigned to a third group of the two or more groups, and there are at least two members of the middle of the pack.

11. The apparatus of claim 10, in which the instructions, when executed, cause the apparatus to: allocate the at least one wager on one of the two or more groups and the at least one other wager on the of the two or more groups to a single pari-mutual pool.

12. The apparatus of claim 10, wherein at least one of the at least one wager on the one of the two or more groups and the at least one other wager on the of the two or more groups are each a fixed odds wager.

13. The apparatus of claim 12, wherein the fixed odds on a respective group may change during the wagering window.

14. The apparatus of claim 10, in which the instructions, when executed, cause the apparatus to: receive a selection of the race and at least one additional wager as part of at least one of a daily double wager and a select n wager.

15. The apparatus of claim 10, in which the instructions, when executed, cause the apparatus to:

determine that the at least one wager on the one of the two or more groups should be allocated to a first pool based on receiving the at least one wager on the one of the two or more groups before a start of the race and determining that the at least one other wager on the another of the two or more groups should be allocated to a second pool based on receiving the at least one wager on the of the two or more groups after the start of the race.

16. The apparatus of claim 10, wherein the first group is assigned a first color, the second group is assigned a second color, and the third group is assigned a third color.

17. An apparatus comprising:

open a pre-race wagering window for a first set of daily double wagers that involve race one and race two for a day in which race one and race two are different races during the day;

receive, at a first time after the pre-race wagering window is open and before race one begins, a first daily double wager on race one and race two for the day;

based on the first time being before race one begins, allocate the first daily double wager to a first pari-mutuel pool;

open an in-race wagering window for a second set of daily double wagers that involve race one and race two for the day;

receive, at a second time after race one begins, a second daily double wager on race one and race two for the day;

based on the second time being after race one for the day the second race begins, allocate the second daily double wager to a second pari-mutuel pool;

determine that the first daily double wager and the second daily double wager are wining wagers based on outcomes of race one and race two for the day; and facilitate, in response to determining that the first daily double wager and the second daily double wager are winning wagers, a first payment for the first daily double wager from the first pari-mutuel pool based on the first daily double wager being allocated to the first pari-mutuel pool and a second payment for the second daily double wager from the second pari-mutuel pool based on the second daily double wager being allocated to the second pari-mutuel pool;

assign each participant of race one to one of a plurality of groups, wherein the first daily double wager includes a selection of a respective group of participants to win race one and the respective groups is one of the plurality of groups, and in which at least one group includes at least two participants, wherein each participant of race one has respective odds associated therewith of winning, wherein based on the odds one participant is deemed a favorite, one participant is deemed a long shot, and the remaining participants are deemed a middle of the pack, and wherein the favorite is assigned to a first one of the plurality of groups, the long shot is assigned to a second one of the plurality of groups, the middle of pack are assigned to a third one of the plurality of groups, and there are at least two members of the middle of the pack.

18. The apparatus of claim 17, in which the instructions, when executed, cause the apparatus to:

close the in-race wagering window based on a participant of race one reaching a designated intermediate point of race one.

19. The apparatus of claim 17, in which the instructions, when executed, cause the apparatus to: receive a selection of race one and race two for the day from among a plurality of available races for inclusion in the first daily double wager from a submitter of the first daily double wager and a receiving a selection of race one and race two for the day from among the plurality of available races for inclusion in the second daily double wager from a submitter of the second daily double wager, and in which both the first pari-mutuel pool and the second-pari-mutuel include wagers based on other races than race one and race two for the day.

* * * * *